United States Patent [19]

Becker et al.

[11] Patent Number: 5,136,690
[45] Date of Patent: Aug. 4, 1992

[54] DYNAMIC GRAPHICAL ANALYSIS OF NETWORK DATA

[75] Inventors: Richard A. Becker, Watchung; Stephen G. Eick, Edison; Eileen O. Miller, Short Hills; Allan R. Wilks, Scotch Plains, all of N.J.

[73] Assignee: AT&T Bell Laboratories, Murray Hill, N.J.

[21] Appl. No.: 672,740

[22] Filed: Mar. 21, 1991

Related U.S. Application Data

[63] Continuation of Ser. No. 390,550, Aug. 7, 1989, abandoned.

[51] Int. Cl.$^5$ .............................................. G06F 3/153
[52] U.S. Cl. ..................... 395/161; 379/122; 379/136; 379/247
[58] Field of Search ................. 364/518, 521; 379/243, 379/245, 247, 248, 96, 121, 122, 133, 134, 136, 137; 395/155–156, 160–161

[56] References Cited

U.S. PATENT DOCUMENTS

| | | | |
|---|---|---|---|
| 3,815,986 | 6/1974 | Darbee | 355/1 |
| 4,455,455 | 6/1984 | Little | 379/203 |
| 4,456,788 | 6/1984 | Kline et al. | 379/137 |
| 4,464,543 | 8/1984 | Kline et al. | 379/247 X |
| 4,601,021 | 7/1986 | Paul et al. | 364/521 |
| 4,608,656 | 8/1986 | Tanaka et al. | 364/521 X |
| 4,811,240 | 3/1989 | Ballou et al. | 364/518 |

FOREIGN PATENT DOCUMENTS 8907377  8/1989  PCT Int'l Appl. .................. 379/136

OTHER PUBLICATIONS

*Op. Res. Q.* (GB), vol. 21, Spec. 161, 1971, "Linmap and Colmap: A Computer Mapping System", G. M. Gaits, p. 161.

*Fifth Annual Simulation Symposium*, vol. 2, 1971, Tampa, Fla., "Simulation of Airport Traffic Flows . . .", F. P. Testa et al., pp. 143–163.

*Proc. of International Conf., Analysing Time Series*, Guernsey, Channel Islands, Oct. 1979, "Analysis and Modeling of Time Series Via Interactive . . .", N. W. Polhemus, pp. 239–267.

Primary Examiner—Gary V. Harkcom
Assistant Examiner—Michael A. Jaffe
Attorney, Agent, or Firm—F. B. Luludis

[57] ABSTRACT

A computer is provided with the facility to display in map form, directed data associated with respective nodes. The operation of the mapping facility is initiated in response to the user entering an appropriate command. Specifically, responsive to the command, the computer displays a plurality of symbols representing respective ones of the nodes such that those symbols which exchange data are connected to one another by a displayed link formed from two half-line segments each indicative of the direction and level of data associated with its respective symbol. In addition, a plurality of tools are displayed for controlling the parameters used in the display of the symbols and links. For example, the user is provided with the capability to change the length of the half-line segments, and is provided with the capability to erase from the display those segments representing data values which are not within a range of data thresholds established by the user operating a threshold tool.

32 Claims, 29 Drawing Sheets

DYNAMIC GRAPHICAL ANALYSIS OF NETWORK DATA

This application is a continuation of application Ser. No. 390,550, filed on Aug. 7, 1989 now abandoned.

FIELD OF THE INVENTION

The invention relates to dynamic graphic arrangements and more particularly relates to an arrangement which displays directed data between pairs of nodes in a network map.

BACKGROUND OF THE INVENTION

A displayed map is often employed to depict a plurality of nodes interconnected via respective links representing a particular relationship between respective pairs of the nodes. For example, the nodes may represent switches in a telephone network with the links representing the level and direction of the data between respective pairs of the switches. (In certain network systems, data is often referred to as "traffic".) In another example, the nodes may represent financial entities (e.g., banks) with the links representing the level and direction of the flow of money from one financial entity to another.

Displayed maps are thus useful in depicting and analyzing the level and direction of the flow of traffic among a plurality of nodes. However, such maps lose their usefulness when the number of displayed links is large, as would be the case in large networks. In such instances, the displayed links become extremely dense, or cluttered, thereby making it virtually impossible to ascertain underlying patterns in the traffic. Accordingly, the informative value of a map displaying an appreciable number of nodes and links is limited as a result of such clutter.

SUMMARY OF THE INVENTION

The limitation inherent in a map displaying a large network comprising an appreciable number of nodes and links is obviated by displaying, in accordance with the invention, a number of tools which the user may operate to control the parameters that are used in displaying such links. Specifically, the user may dynamically reduce in real time such displayed clutter by controlling the length of the displayed links interconnecting the network nodes. For example, the length of a link may be controlled by displaying the link as two half-line segments and reducing each half-line segment by a selected ratio. The user may further reduce clutter by dynamically erasing from the display those links whose level of data flow falls outside of a selected range of link statistics. Accordingly, the user may rapidly adjust the length of displayed links and range of link statistics until the map reveals useful underlying patterns in the links that remain on the display.

BRIEF DESCRIPTION OF THE DRAWING

These and other objects and features, together with the operation and utilization of the present invention will be more apparent from the illustrative embodiment shown in conjunction with the drawings in which.

DETAILED DESCRIPTION

Figure 1:
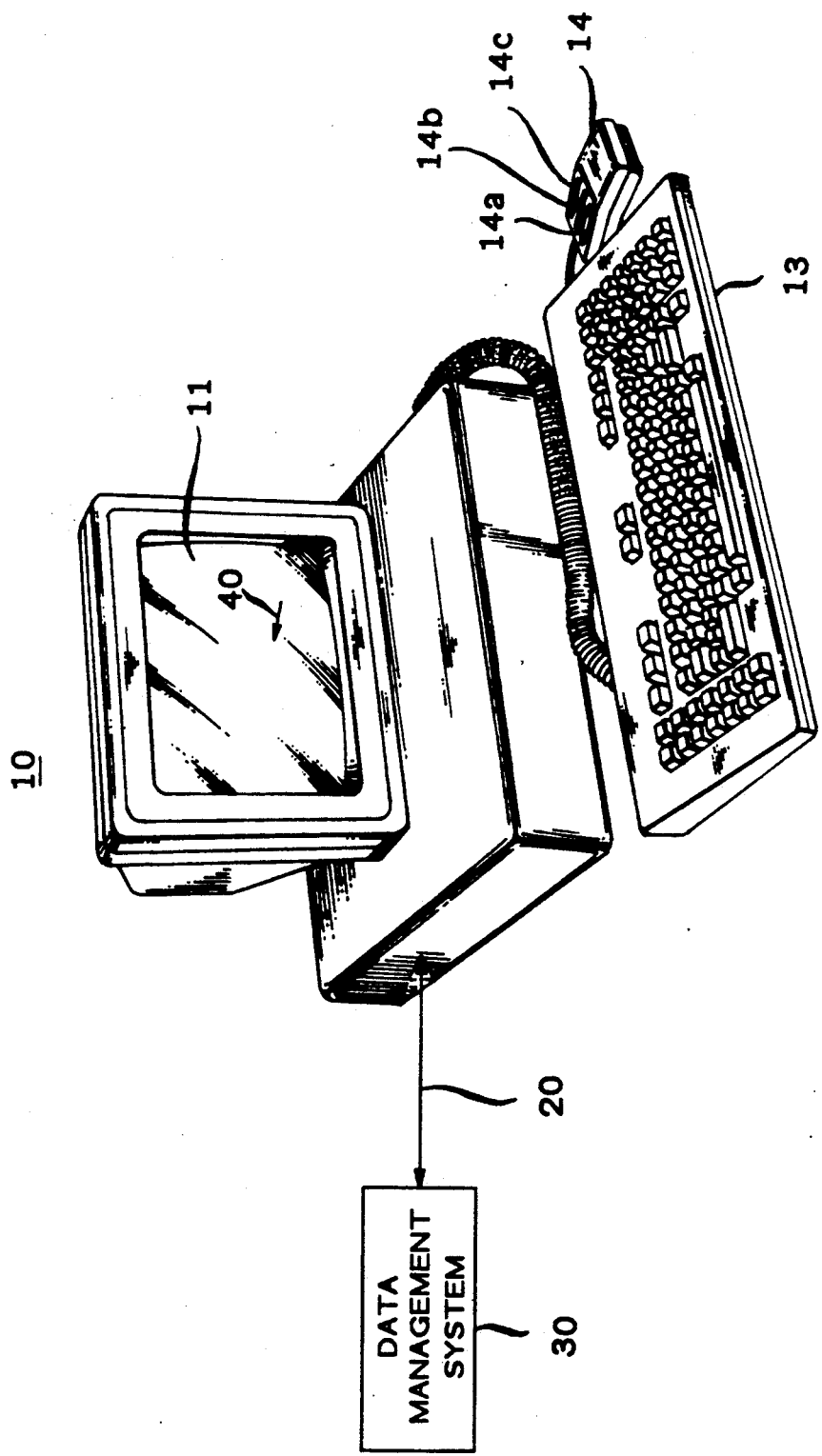
FIG. 1 is a broad block diagram of a computer arrangement in which the present invention is illustratively implemented.

Computer 10 depicted in FIG. 1 operates under a predetermined operating system—illustratively the UNIX operating system. Computer 10, which may be, for example, the IRIS workstation available from Silicon Graphics, Inc. of Mountain View, Calif., includes a screen 11, keyboard 13 and mouse 14 as well as other internal components not explicitly shown in the FIG., such as a hard disk drive. The keyboard and mouse, more particularly, provide a mechanism for the user to input information and instructions to the computer. For example, the user may invoke a particular task identified on the screen by operating mouse 14 in a conventional manner to cause screen cursor 40 to point at that task. The user may then invoke the task by operating a respective one of the mouse keys, or buttons, 14a through 14c, as will be discussed below.

Associated with computer 10 is a communication link 20 which allows computer 10 to communicate with central data management system 30. Central data management system is of the type which, from time to time, polls a plurality of network nodes, one by one, to collect specific data relating to their operation. In contemplation of the invention, such network nodes could be, for example, airline terminals, in which the collected data could relate to passenger counts, average delays, etc.; banks, in which the collected data could relate to financial transactions; telephone switching centers, in which the collected data could relate to telephone calls; and so on. Such data could also be long term data relating to, for example, population and migration patterns. After such data has been collected, computer 10 may obtain from computer 30 via line 20 a copy of the collected data for display on screen 11.

Of the above-mentioned sources of directed data, we have found that telephone switching centers collect a considerable amount of directed data relating to the telephone calls that such centers process throughout the day. Accordingly, the following will discuss the invention in the context of a particular telephone network—illustratively the AT&T public switched network. As is well known, the AT&T network comprises a plurality of network nodes, or switching centers. Each such switching center is arranged to accumulate statistics associated with the telephone calls that it processes. The statistics include, inter alia, (a) the number of calls that are blocked, or overflowed ("toc"); and (b) the average holding times of telephone calls ("hold"). The switching centers accumulate the statistics on a five minute interval basis, and then supply the statistics to central data management system 30, thereby making a copy of the statistics available to computer 10 for display on screen 11, as will now be discussed.

In particular, the data that computer 10 collects from data management system 30 is identified by the day of the year that the switching centers accumulated the data, and is stored in similarly named directories contained in the memory of computer 10. After computer 10 is turned on and has performed some initial tasks, including the "booting" of the operating system from the computer 10 hard disk unit, computer 10 displays the well-known Unix system prompt. To access data which has been accumulated on a specific date, the user enters via keyboard 13 a command to access a particular data directory, that is, the user enters "cd" followed by the corresponding date. In the present illustrative example, it is assumed that the user desires to analyze particular data accumulated on November 18. Accordingly, the user enters via keyboard 13 the following command:

cd November 18

On the next Unix system prompt, the user enters via keyboard 13 the letter "S" to initiate processing of the well-known S language software. (In a preferred embodiment of the invention, the S language is used for internal database management. The S language is disclosed in the text titled *The New S Language*, authored by R. A. Becker, J. M. Chambers and A. R. Wilks, and published by Wadsworth & Brooks/Cole, Pacific Grove, Calif. (1988).)

In the present illustrative example of the invention, it is also assumed that the user desires a map displaying the data relating to the number of calls blocked (toc) for a particular hour, for example, the 13th hour, of the selected day. It is to be understood, of course, that the following discussion pertains equally well to the other categories of statistics, as will be shown below. Accordingly, to select data, or statistics, relating to the number of calls that were blocked for the 13th hour of the selected date, the user next enters via keyboard 13 the following command:

pairmap(toc(13))

Figure 2:
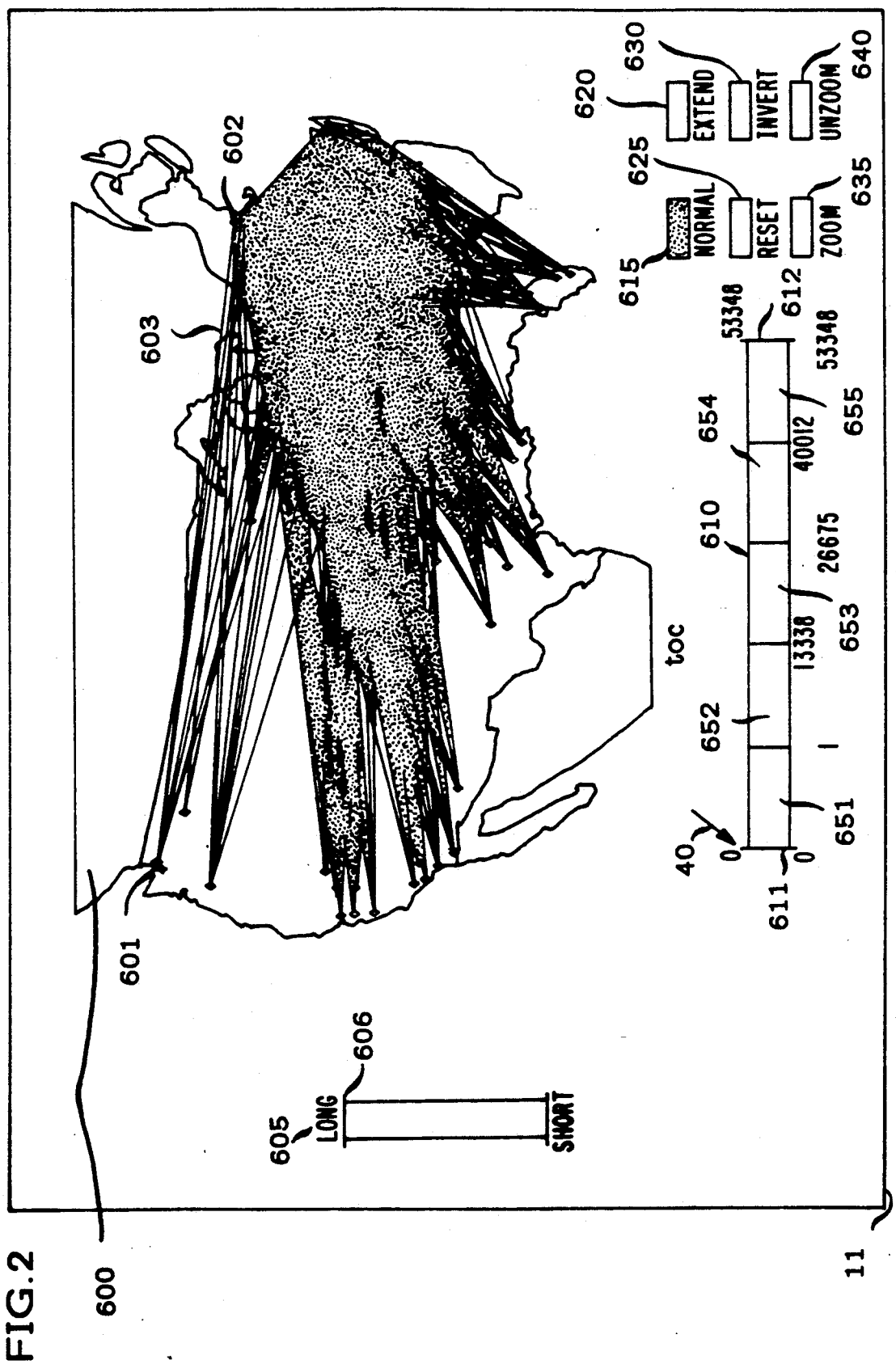
FIGS. 2 through 15 show various stages of a first type of directed data as mapped on the screen of the computer of FIG. 1 in accordance with the principles of the invention.

Computer 10 responsive to the latter command unloads from its memory the pertinent data and displays the data in the form of a map, as shown in FIG. 2.

In displaying map 600 on screen 11, computer 10 paints an outline of the U.S. (as well as portions of Canada and Mexico) and then displays within that outline the various network nodes positioned at their respective locations within the U.S., in which each node is represented by a symbol having a somewhat diamond shape. Computer 10 also paints on screen 11 lines representing the links, or communication paths, interconnecting respective pairs of the nodes experiencing overflow. As an aspect of the invention, the line between a pair of nodes, such as line 603 between nodes 601 and 602, is actually formed from a number of segments—illustratively two half-line segments—in which each segment is painted a particular color to represent the number, or level, of the calls that are sent by one node to the other node of a respective pair of nodes and which are blocked at the other node. That is, the colored half-line segments represent the direction and level of data relating to blocked calls accumulated by respective ones of the network nodes during the 13th hour of the selected date, as will be pointed out below.

Computer 10, in accord with the invention, also paints on screen 11 a number of tools which the user may operate to control the parameters which computer 10 employs to map the desired data on screen 11. In particular, the user may operate slider bar 606 of tool 605 (hereinafter size tool 605) to adjust the length of each half-line segment. That is, the user may shorten each of the displayed half-line segments by pointing mouse cursor 40 to the slider bar 606, depressing button 14a, and sliding the cursor downward in the conventional manner from LONG to SHORT. Computer 10, responsive thereto shortens each of the half-line segments commensurate with the position of slider bar 606 on size tool 605. (Hereinafter the term "points to" and the variants of that term will be taken to mean the action of moving mouse screen cursor 40 to an object or symbol displayed on screen 11, and is meant to include other terms that are understood by the art and which define similar functions. For example, it includes moving a screen cursor to the location if displayed text or to an entry in a menu of displayed entries (items) and operating, for example, an enter key; "touching" a touch sensitive panel overlaying screen 11; or even identifying particular displayed text or a menu of entries using terminal buttons, for example, computer keyboard buttons.)

The user may also establish a data threshold by operating slider bar tool 610 (hereinafter threshold tool 610). That is, the user may erase from screen 11 those line segments representing data values which are below a desired threshold, or which are not within a range of thresholds set by the user operating tool 610. It is seen from the FIG. 2 that tool 610 ranges from—illustratively 0—to—illustratively 53348—, meaning that all half-line segments, or links, representing data values between 0 and 53348 (the minimum and maximum data values) are displayed on screen 11, as based on the values of the lower and upper thresholds of tool 610. If the user desires to set a lower threshold, then he/she may do so by pointing to slider bar line 611 and moving it to the right by "dragging" mouse cursor 40 in that direction in the conventional manner. As the user moves slider bar 611, computer 10 displays above the bar the current value of the lower threshold and dynamically erases from screen 11 those half-line segments whose respective data values are below the value of the lower threshold.

Similarly, the user may establish an upper threshold by pointing to slider bar 612 and moving it to the left using mouse cursor 40 in the conventional manner. When the user does so, computer 10 displays on screen 11 the value of the upper threshold, as will be shown below.

As mentioned above, each half-line segment is displayed in a particular color to represent its respective data value. In our arrangement, a half-line segment is painted in one of—illustratively five—colors matching the color legend 651 through 655 making up threshold tool 610. Although it is not readily apparent from FIG. 2, the five colors 651 through 655 of the legend are—illustratively gray, cyan, green, yellow and red.

Thus, if the color of a half-line segment is, for example, green, then its respective data value is within the range of data values of 13,338 through 26,675. If, on the other hand, the color of a half-segment happens to be yellow, then its respective data value is within the range of data values of 26,675 through 40,012, and so on.

Displayed in the lower right-hand corner of map 600 are six additional tools that the user may employ to analyze map 600. Specifically, the "Normal" tool 615 is used to display those half-line segments whose associated data values correspond with the current threshold (or range of thresholds) established using tool 610. The "Extend" tool 620 is used in the instance where one of two half-line segments making up a link has been erased from the screen as a result of the user operating threshold tool 610 and the user desires to ascertain which one of the nodes that the remaining half-line segment extends to. The user solves this problem by pointing to Extend tool 620, as will be shown below.

When the user points to "Invert" tool 630, computer 10 deactivates all of the displayed nodes and erases from screen 11 their associated half-line segments, as will be shown below. The user may thereafter reactivate the nodes by pointing to "Reset" tool 625. The user may magnify a particular area of the displayed map by pointing to "Zoom" tool 635. Specifically, the user may magnify an area of the map by (a) pointing to Zoom tool 635 and operating mouse button 14a; (b) then pointing to one corner of the area to be magnified, for example, the upper left-hand corner and depressing button 14a; (c) then moving the mouse cursor diagonally to the opposite corner (for example, the lower right-hand corner) and releasing button 14a. Thereafter, the user may restore the magnified area to its original displayed size by pointing to "Unzoom" tool 640 and operating button 14a.

The user is also provided with several other tools not explicitly shown in the FIG. For example, the user may deactivate one or more nodes and their associated links by operating mouse button 14b while pointing to the nodes, one at a time. The deactivated nodes are displayed in a particular color, for example, cyan. Thereafter, the user may reactivate a deactivated node by pointing to its cyan colored symbol and operating mouse button 14a. Alternatively, the user may reactivate all nodes having an inactive status by operating tool 625, as will be shown below.

Another tool not explicitly shown in the FIG. allows the user to display the identity of a node. The user does this by marking the node as being a so-called current node, that is, by moving mouse cursor 40 to a point which is within the vicinity of a node. When mouse cursor 40 is so positioned, then computer 10 displays on screen 11 the identity of the current node. Computer 10 continues to display such identity as long as mouse cursor 40 remains positioned within the vicinity of the current node. In our arrangement, it is also possible to display the data values expressing the relationship between two nodes, i.e., between a so-called anchor node and a current node. A node is made the anchor node by positioning mouse cursor 40 within the vicinity of the node that is to be so marked and operating mouse button 14c. Computer 10 responsive to that action displays the identity of the anchor node as well as the level of data exchanged between the anchor and current nodes.

With the foregoing in mind, we will now discuss how the user may employ the various tools described above to reduce, or remove, the clutter presented in map 600 as a result of the high density of the displayed links indicative of the high number of blocked calls that occurred between pairs of the network nodes during the priorly selected hour and date.

Figure 3:
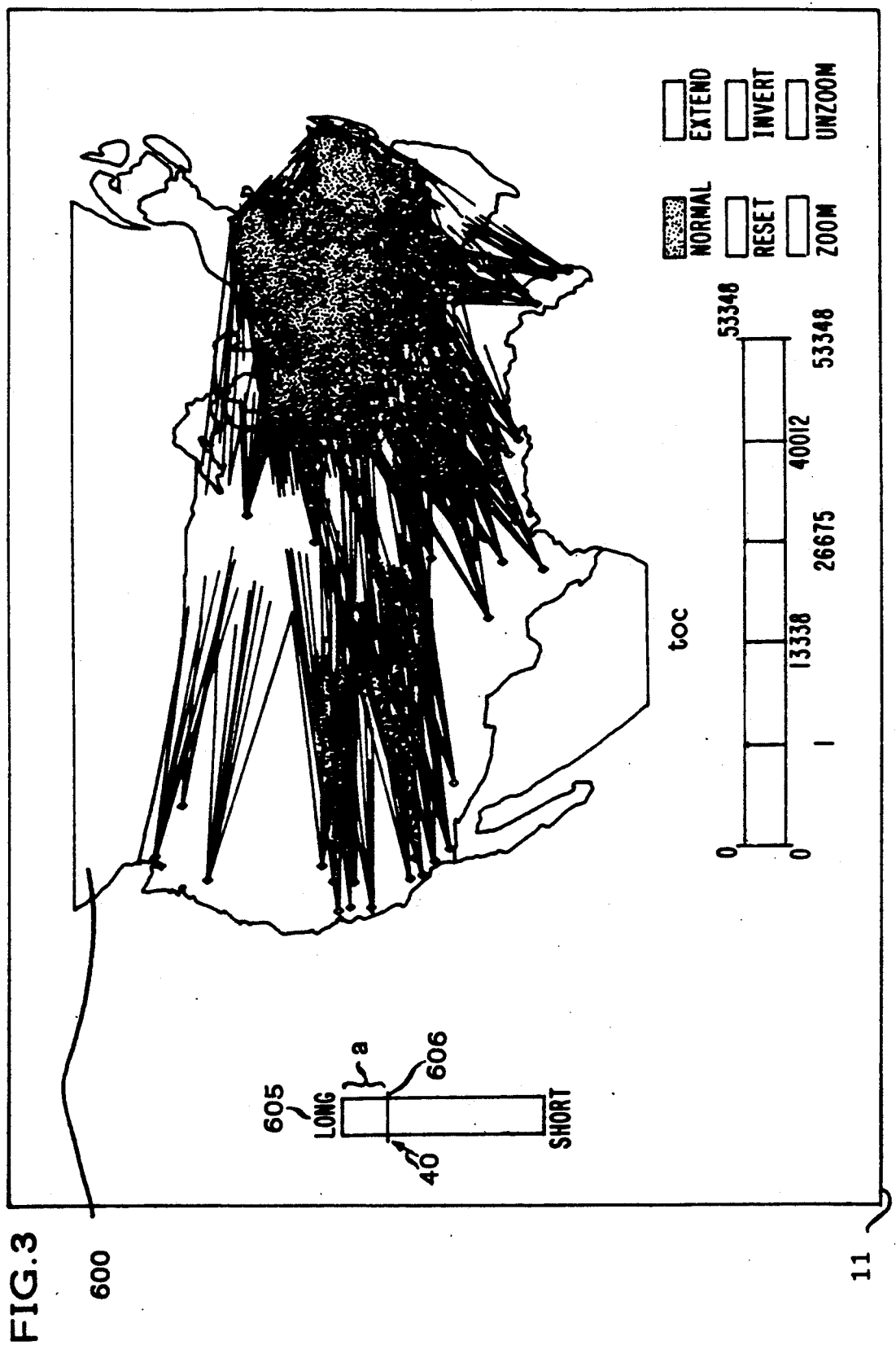

To begin with, the user may employ size tool 605 in the manner discussed above to adjust the length of each half-line segment by a selected ratio as a means of reducing some of the clutter resulting from the displaying of a large number of links, as shown in FIG. 3. It seen from the FIG. that the user has moved slider bar 606 downward some distance "a" through the range of values presented by tool 605, thereby causing the length of the half-line segments to be reduced by a commensurate amount. It can also seen from the FIG. that as a result of shortening the length of the half-line segments, or links, the clutter presented thereby has been reduced somewhat, but not markedly. At this point, the user may further advance slider bar 606 downward, thereby further shortening the length of the half-line segments, or links, as shown in FIG. 4.

Figure 4:
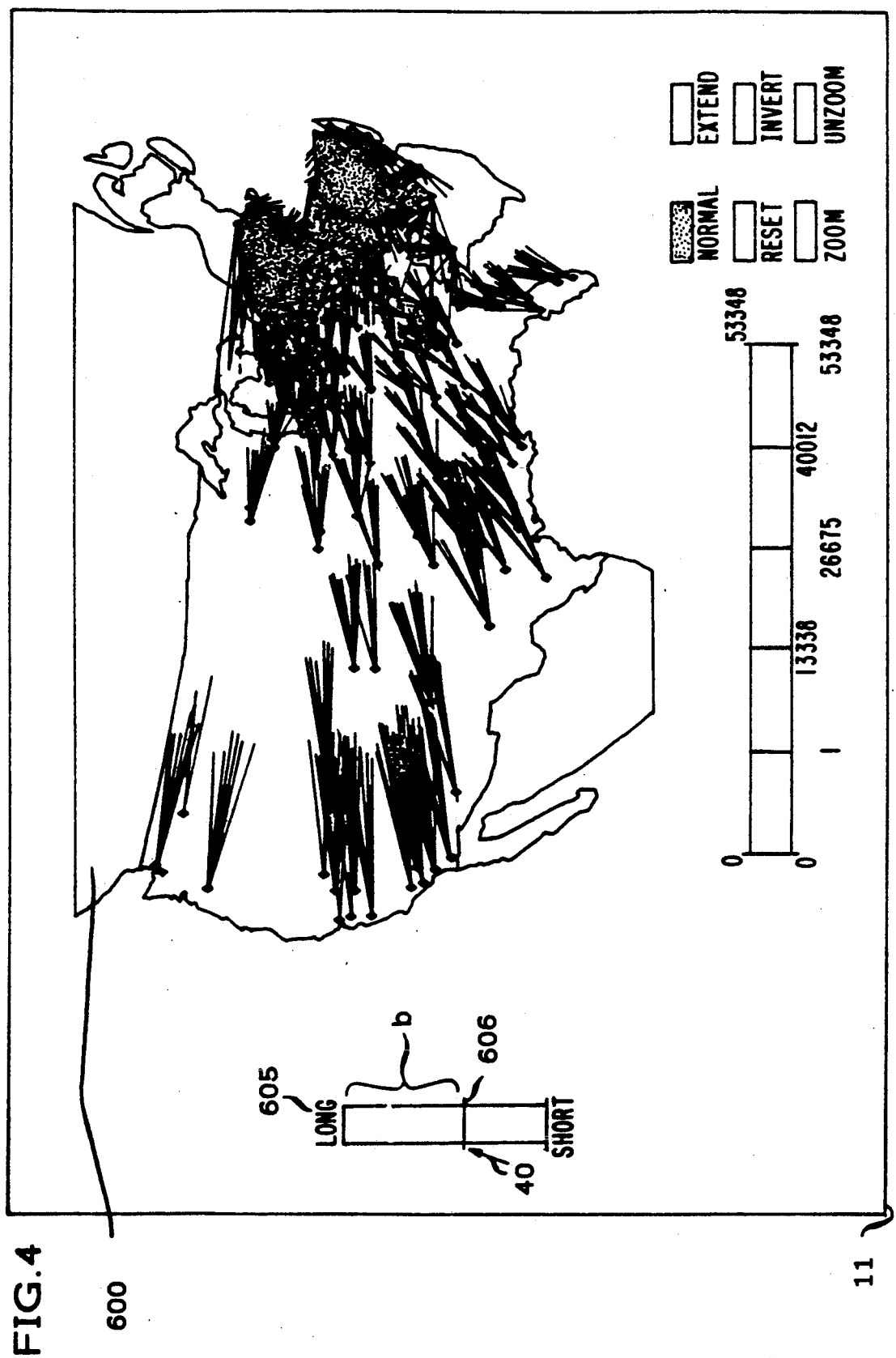

It is seen from FIG. 4 that the user has moved slider bar 606 downward some distance "b", thereby shortening the half-line segments to less than 50 percent of their original lengths. As a result thereof, the user has considerably eliminated the clutter in the Western half of the U.S. More importantly though, while a visual inspection of the FIG. does not reveal the underlying patterns contributing to the density of the half-line segments, it, nevertheless, reveals that the cause for the clutter, or congestion, may possibly be due to a problem occurring in the Northeast region of the U.S.

Figure 5:
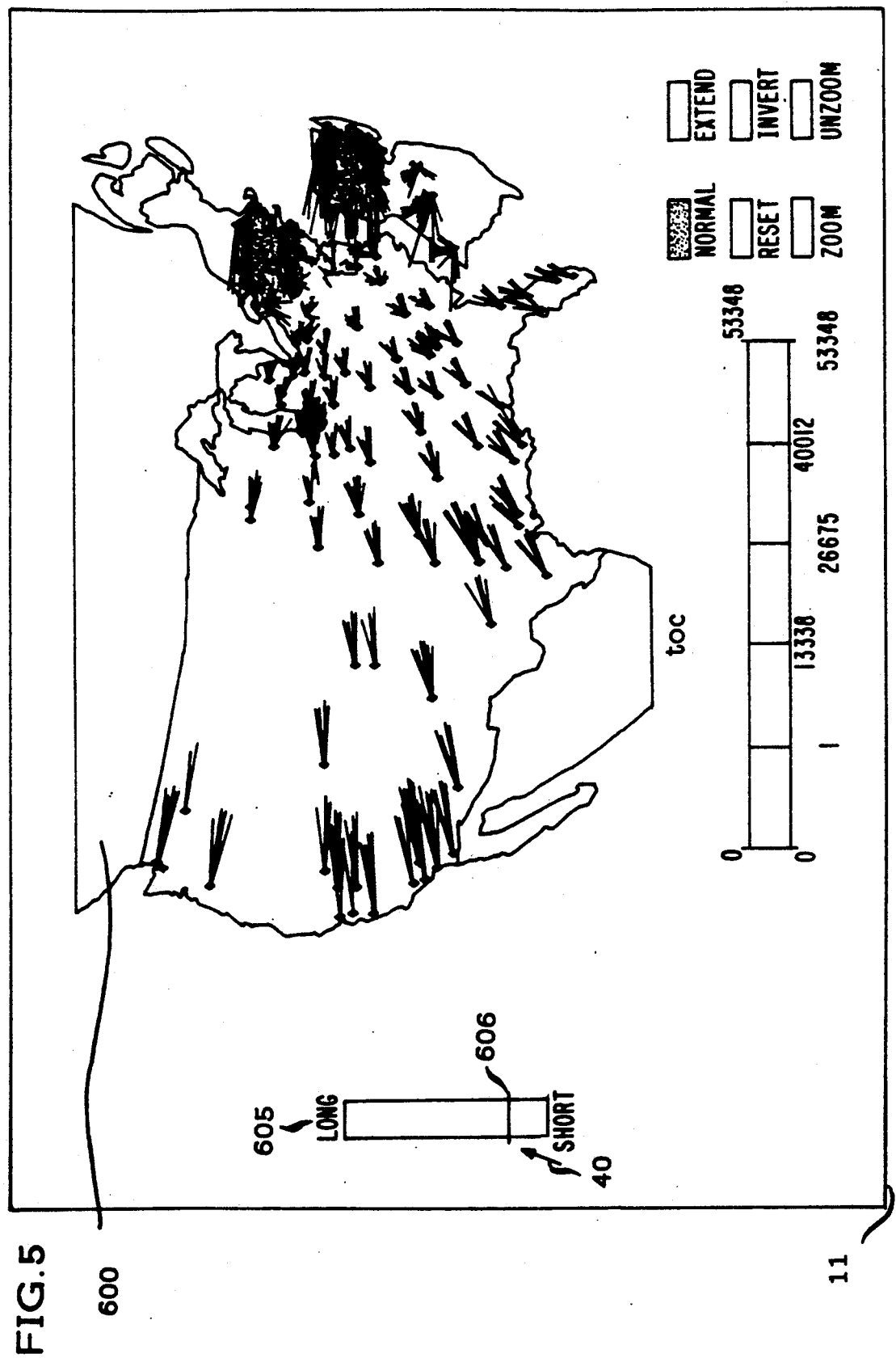
Figure 6:
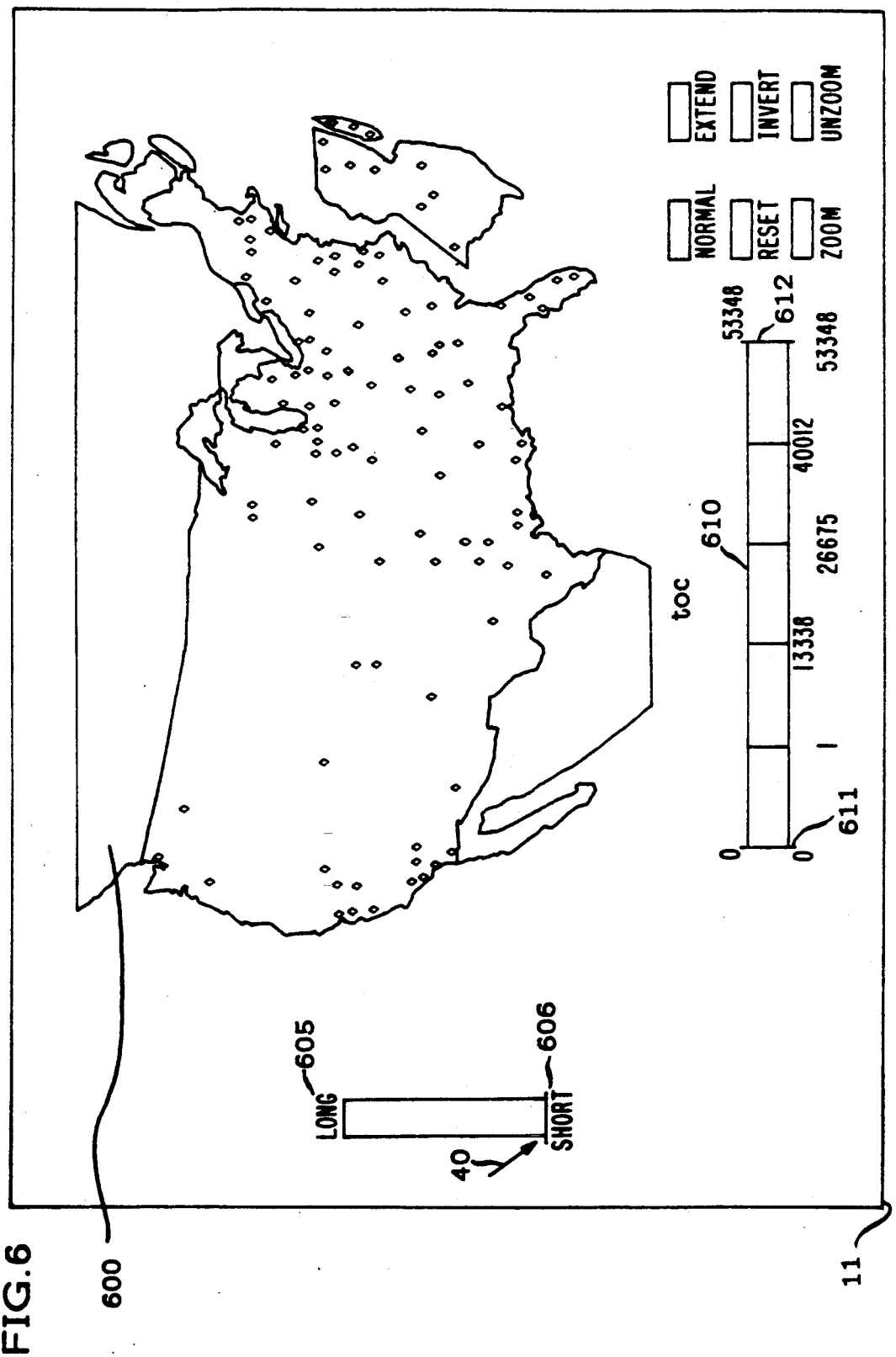

To confirm that suspicion, the user may further shorten the half-line segments, as shown in FIG. 5. A visual inspection of the FIG. virtually confirms the user's suspicion that a problem exists in the Northeast. (It is seen from FIG. 5, that as a display expedient, a portion of the Northeast, namely New Jersey, southern New York and eastern Pennsylvania are shown detached from the U.S. mainland.) It is noted that if the user continues to operate tool 605 so as to position slider bar 606 at the bottom of the scale, then the half-line segments will be shortened to a point where their respective lengths will be zero, as shown in FIG. 6.

Having identified the possible location of the problem, the user may then go on to employ one or more of the other aforementioned tools to further reduce the clutter in the Northeast region of the map to reveal which of the nodes in that region is experiencing the highest level of congestion. The one tool which proves to be the most effective in reducing clutter in a displayed map is threshold tool 610. Therefore, the user operating that tool in the manner discussed above may cause the tool to rapidly traverse the full range of thresholds to obtain a quick overview of which of the nodes, or node, is experiencing the various levels of overflow. The user may quickly traverse through the range of thresholds of tool 610 by continuously operating mouse button 14a and pointing to slider bar 611 and "dragging" it to the right using cursor 40 in the conventional manner. As the user moves slider bar 611 from left to right, computer 10 dynamically updates the map display in real time to show only those half-line segments whose respective data values meet the current threshold values that are being displayed on screen 11, as shown in FIG. 7.

Figure 7:
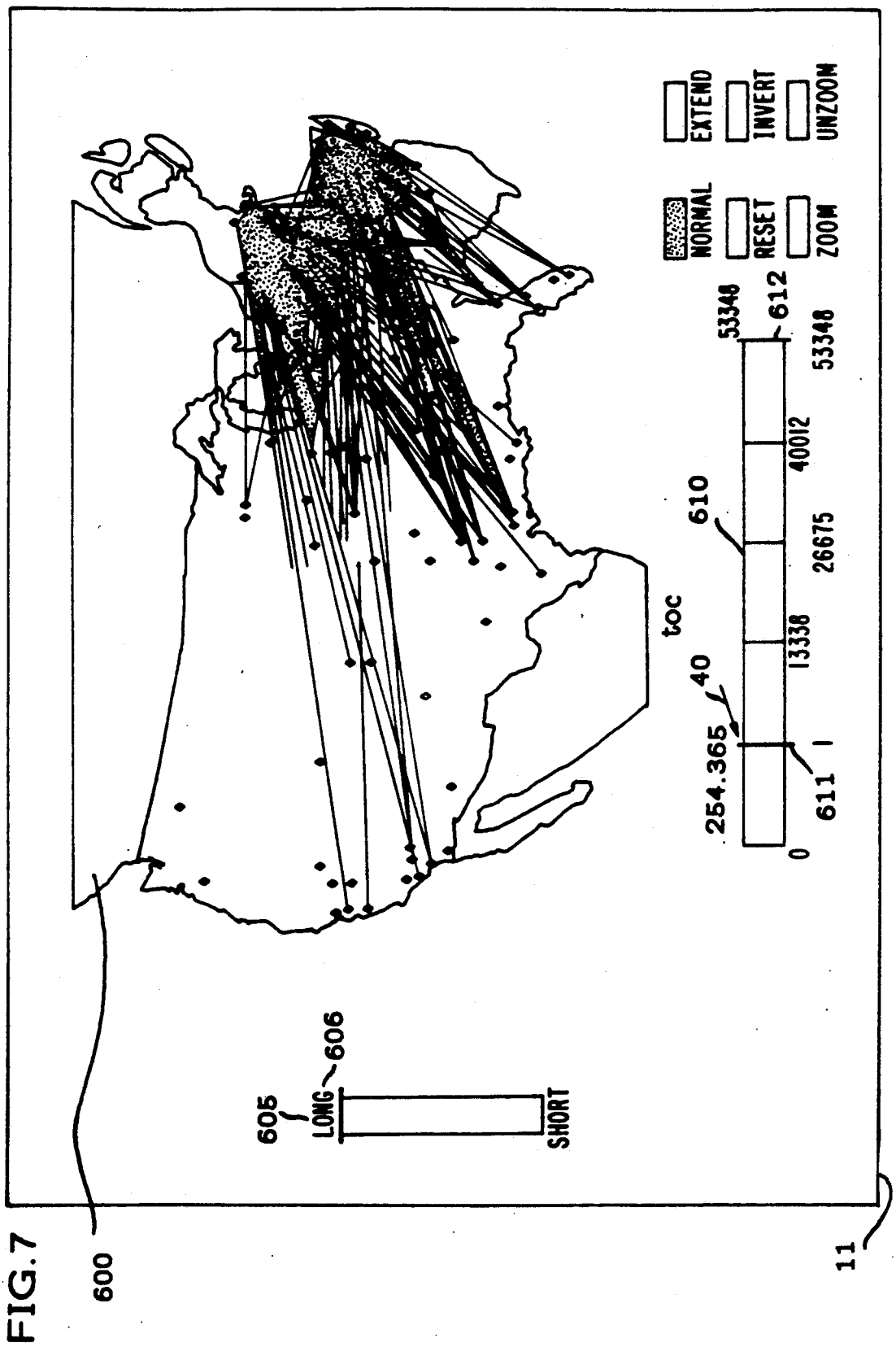

It is seen from FIG. 7, that slider bar 606 of tool 605 has been returned to its original position, thereby restoring the full length of each displayed half-line segments. Also, the user has moved slider bar 611 to the right to a point establishing a lower threshold value of 254.365. As a result of establishing that threshold, computer 10 has erased from screen 11 those half-line segments whose data values are below the current value of the lower threshold, thereby eliminating a considerable amount of the displayed clutter and thereby revealing the node pairs experiencing the highest level of blocked calls.

Figure 8:
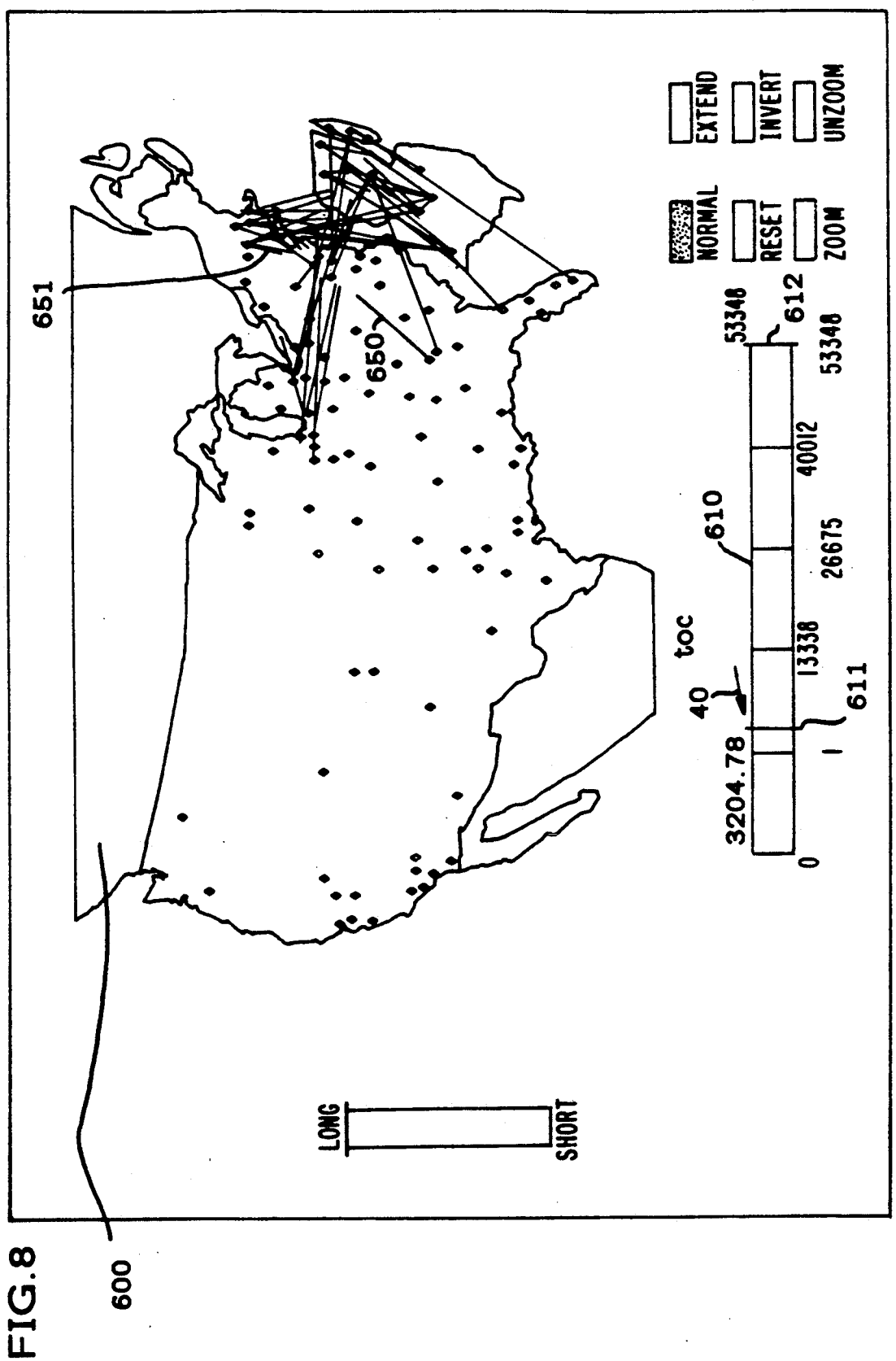

At this point, the user may further reduce the remnants of the clutter by further moving slider bar 611 to the right over the range of thresholds, as shown in FIG. 8. It is seen from FIG. 8 that the remnants of the clutter are further reduced and that at least one of the displayed links, such as link 650 and the links collectively designated 651, respectively, are half links, meaning that the data values of the half-line segments associated with segments 650 and 651 are below the lower threshold of 3204.78.

It can be appreciated that, although much of the clutter has been eliminated from the display, map 600 is still not at a point where it reveals which pair of nodes is experiencing the highest level of overflow. Accordingly, the user may further raise the lower boundary of threshold tool 610, and reveal those nodes, as shown in FIG. 9.

Figure 9:
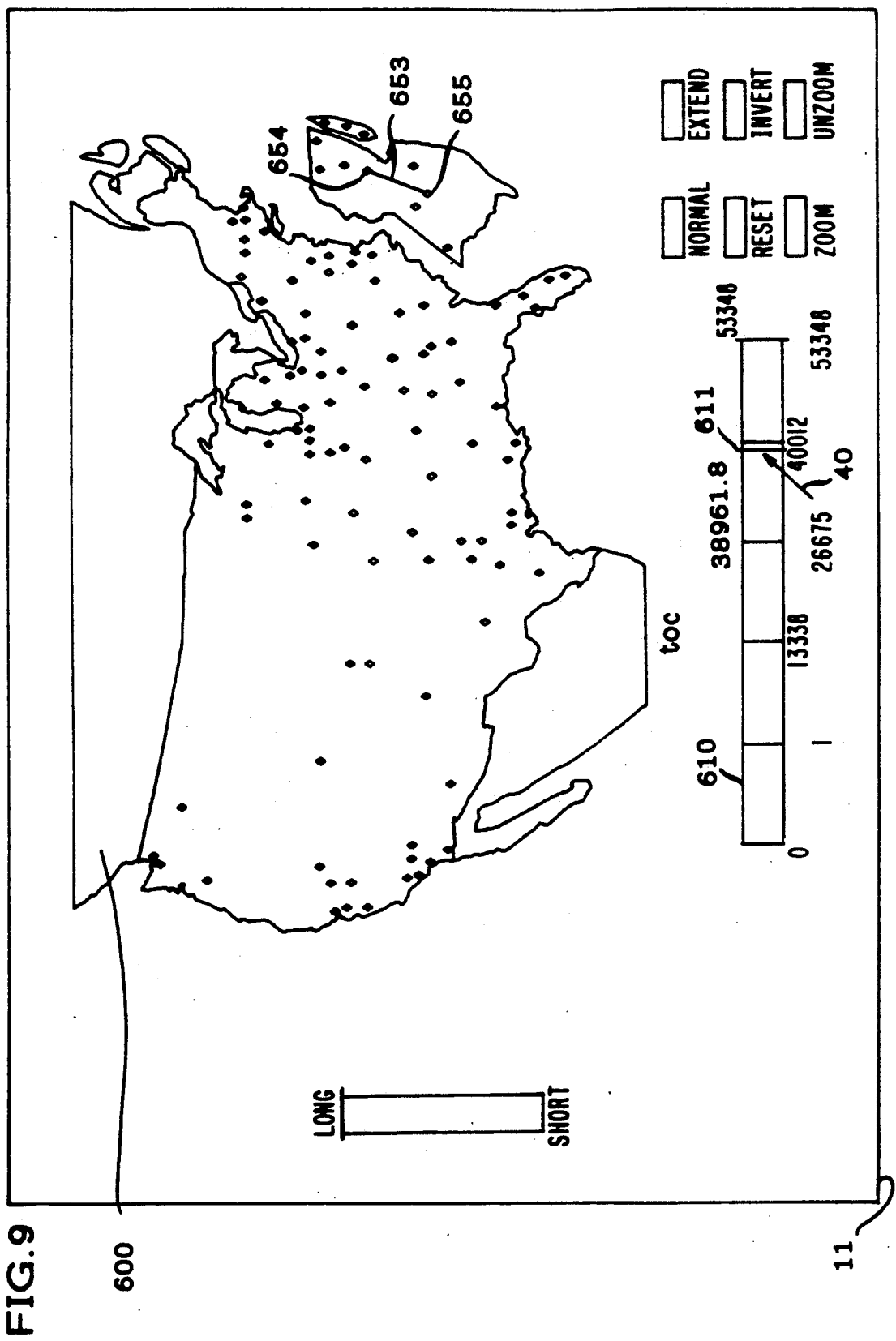

It is seen from FIG. 9 that the user has increased the lower threshold to a value of 38961.8, thereby causing all but one of the links to be erased from screen 11. As mentioned above, a link, such as link 653, is formed from two half-line segments. One half-line segment starting from node 654 is indicative of of the fact that at least 38,961.8 of the calls that node 654 sent to node 655 during the selected hour were blocked at node 655. Similarly, the other half-line segment starting from node 655 is indicative of the fact that at least 38,961.8 of the calls that node 655 sent to node 654 during the selected hour were blocked at node 654.

Thus, by operating threshold tool 610 the user has reduced the clutter in map 600 to a single link, thereby identifying the possible link experiencing the highest level of blocked calls.

Figure 10:
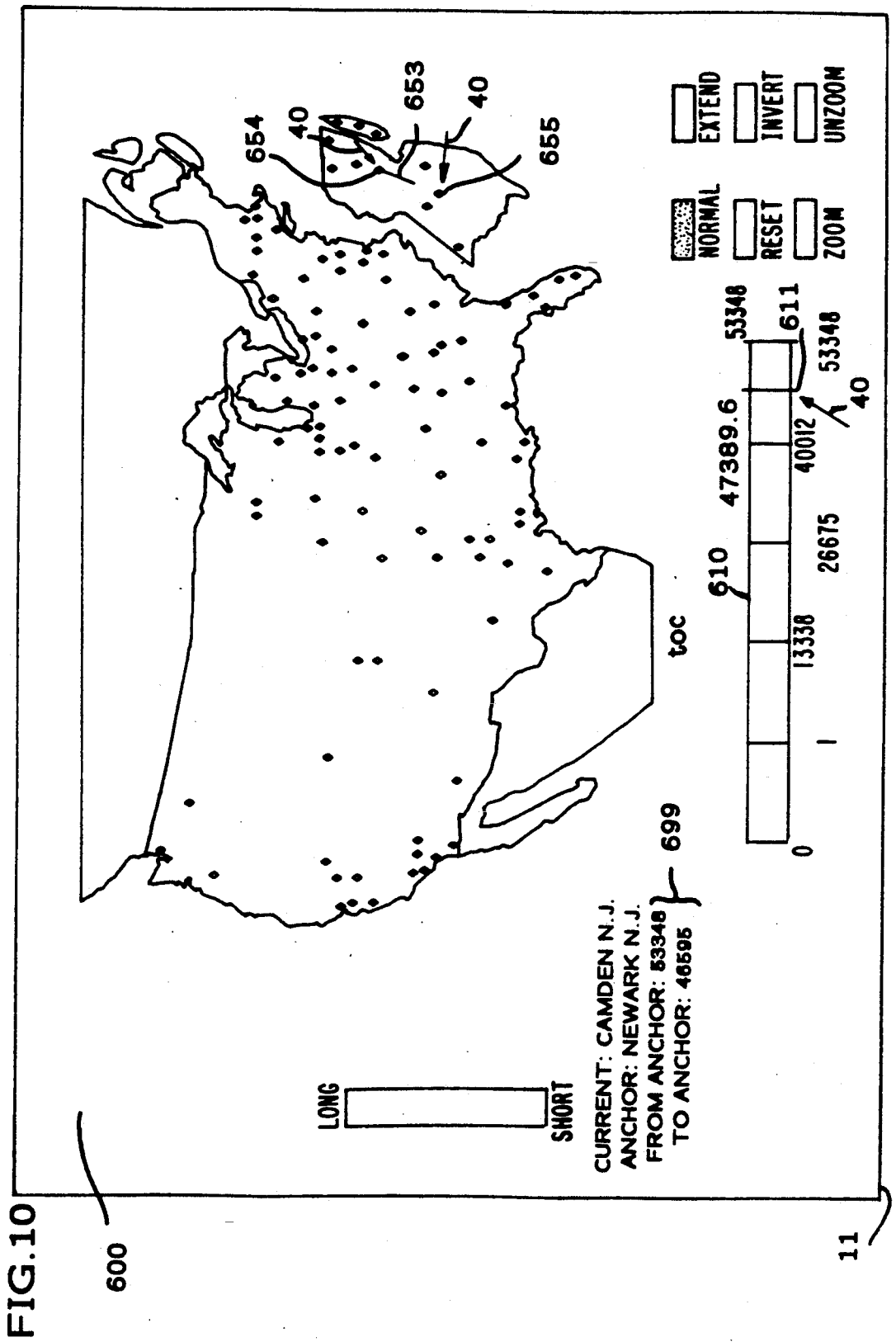

To determine whether the overflow from node 654 to node 655 is greater than the overflow from node 655 to node 654, the user may further raise the boundary of the lower threshold by moving slider bar 611 to the right, in the manner discussed above. When the user does so, the lower threshold is raised to a point where one of the two-half line segments forming link 653 is erased from screen 11, as shown in FIG. 10. It is seen from the FIG. that the user has set the lower threshold to a value of 47389.6, thereby indicating that at least 47,389.6 of the calls sent from node 654 to node 655 were blocked during the selected hour.

To identify nodes 654 and 655, the user has marked node 654 as being the anchor node and has marked node 655 as being the current node. As a result thereof, computer 10 now displays node 655 in the color magenta and displays the current node, node 654, in the color yellow. Computer 10 also displays the identity and statistics associated with those nodes. It is seen from the FIG. that node 654, marked the anchor node, is located in Newark, N.J., and node 655, marked the current node, is located in Camden, N.J.

An important aspect of the invention is that the numerical statistics to and from the anchor node are displayed on screen 11, thereby providing the user with a graphical method to access the statistics. Accordingly, the screen now shows at 699 that there were 53,348 blocked calls from Newark to Camden and 46,595 from Camden to Newark.

Figure 11:
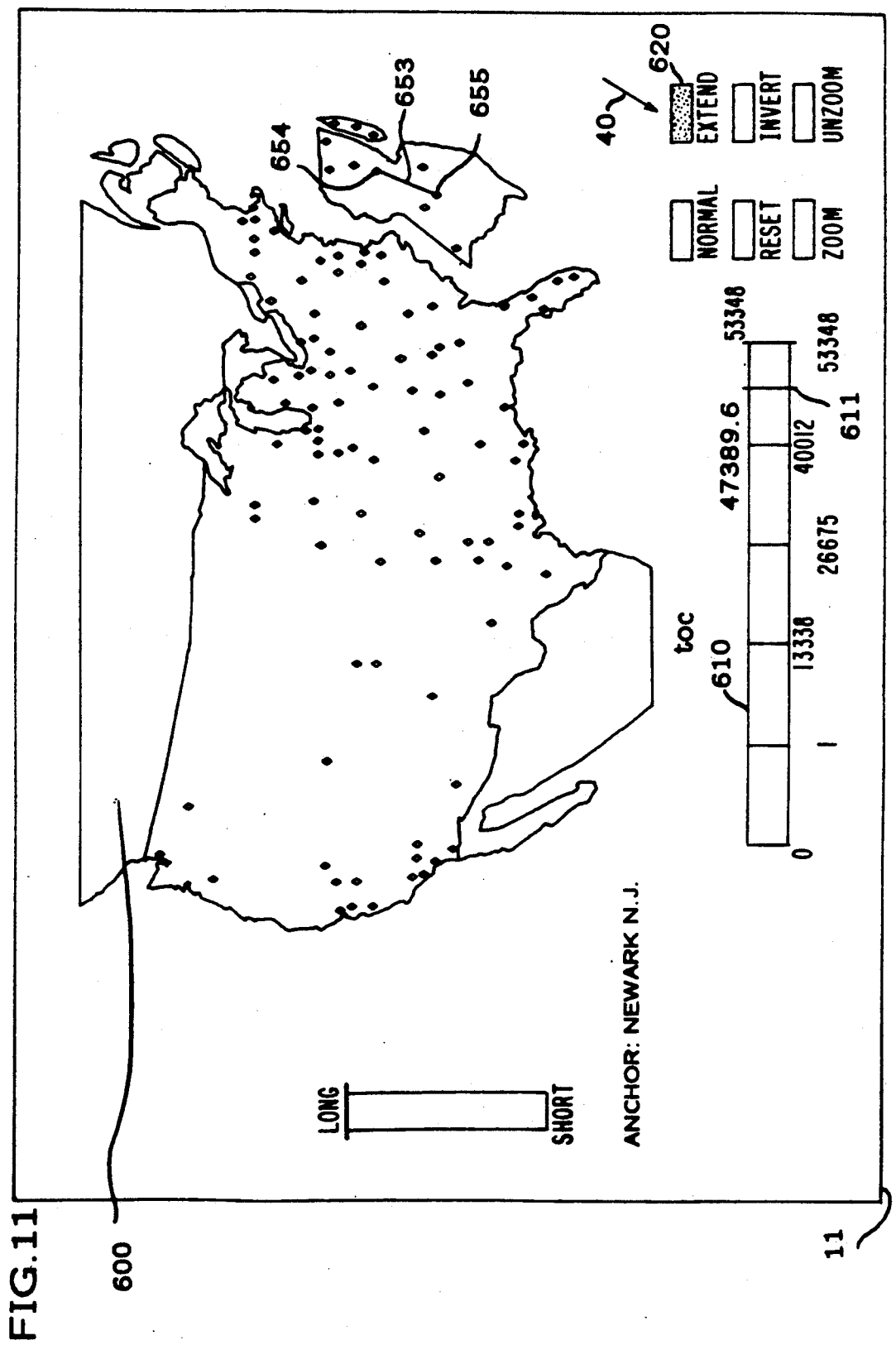

As an aspect of the invention, the user may extend link 653 to node 655, in the manner discussed above, even though the half-line segment that was erased from screen has a data value below the current value of the lower threshold, as shown in FIG. 11. It is seen from FIG. 11, that computer 10 has extended link 653 as directed by the user and now displays "Extend" tool 620 in the color red.

Figure 12:
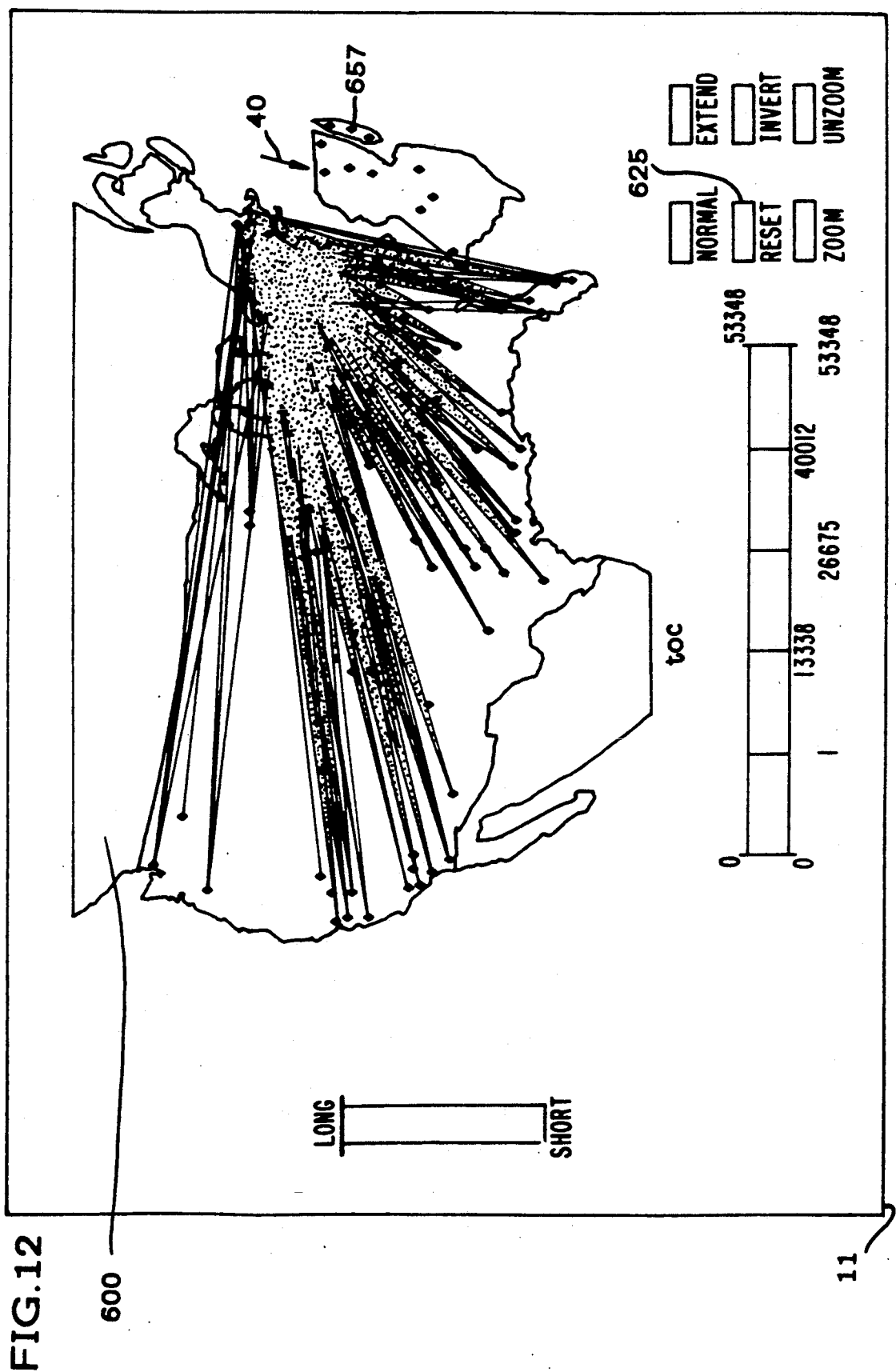

As mentioned above, the user is provided with the capability of using mouse cursor 40 as a brush to deactivate a displayed node. To perform such brushing, the user points to the pertinent node while mouse button 14b is pressed, as shown in FIG. 12. FIG. 12 illustrates map 600 as it was originally brought up on screen 11 with the exception that the user has deactivated the links associated with the nodes collectively designated 657. It is noted that the nodes which have been deactivated are displayed in the color cyan to indicate their inactive status. To reactivate a deactivated node, the user points to the deactivated node and operates mouse button 14a. The user may globally reactivate all such nodes and their associated links by operating Reset tool 625, as mentioned above.

Figure 13:
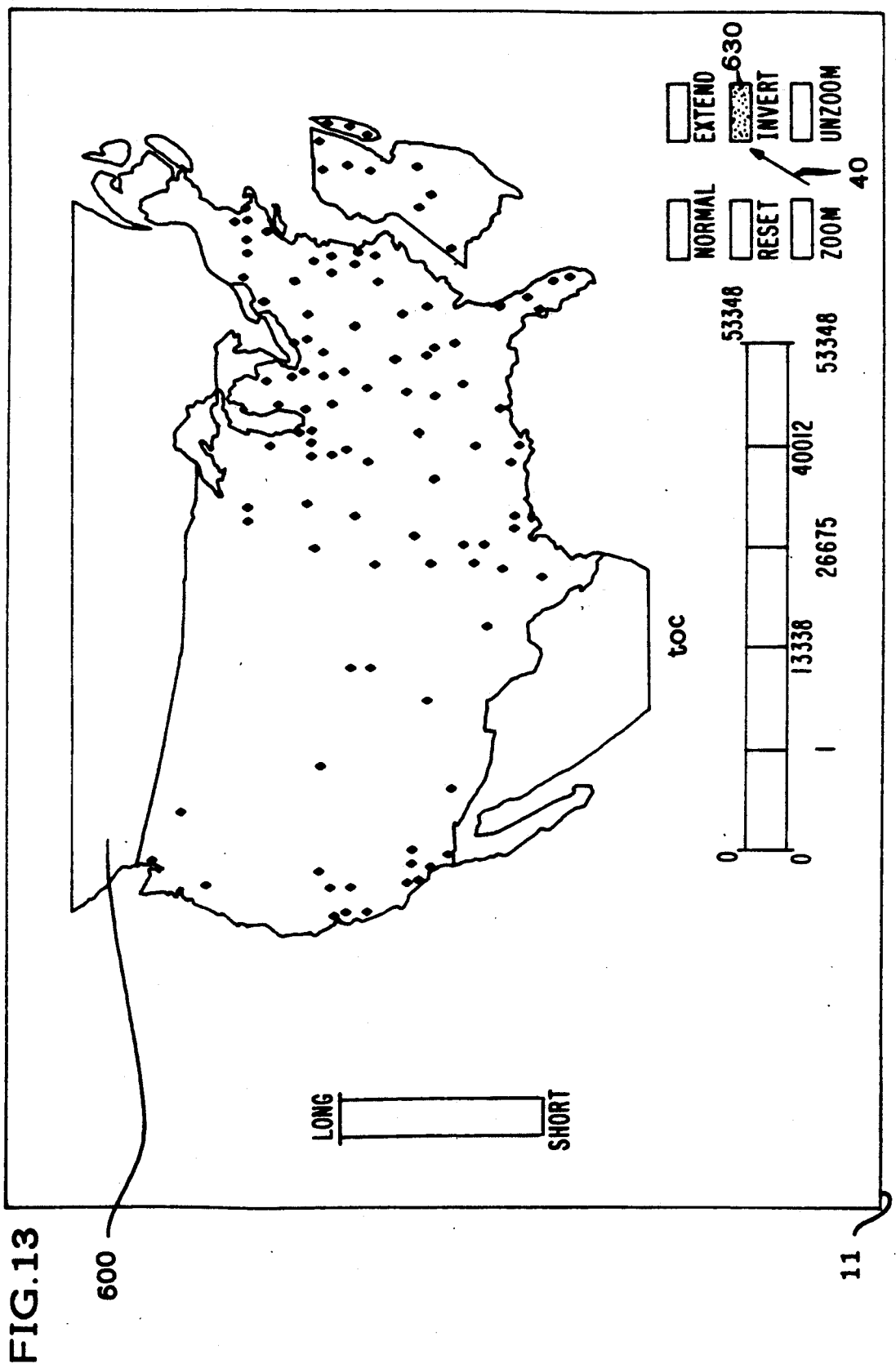
Figure 14:
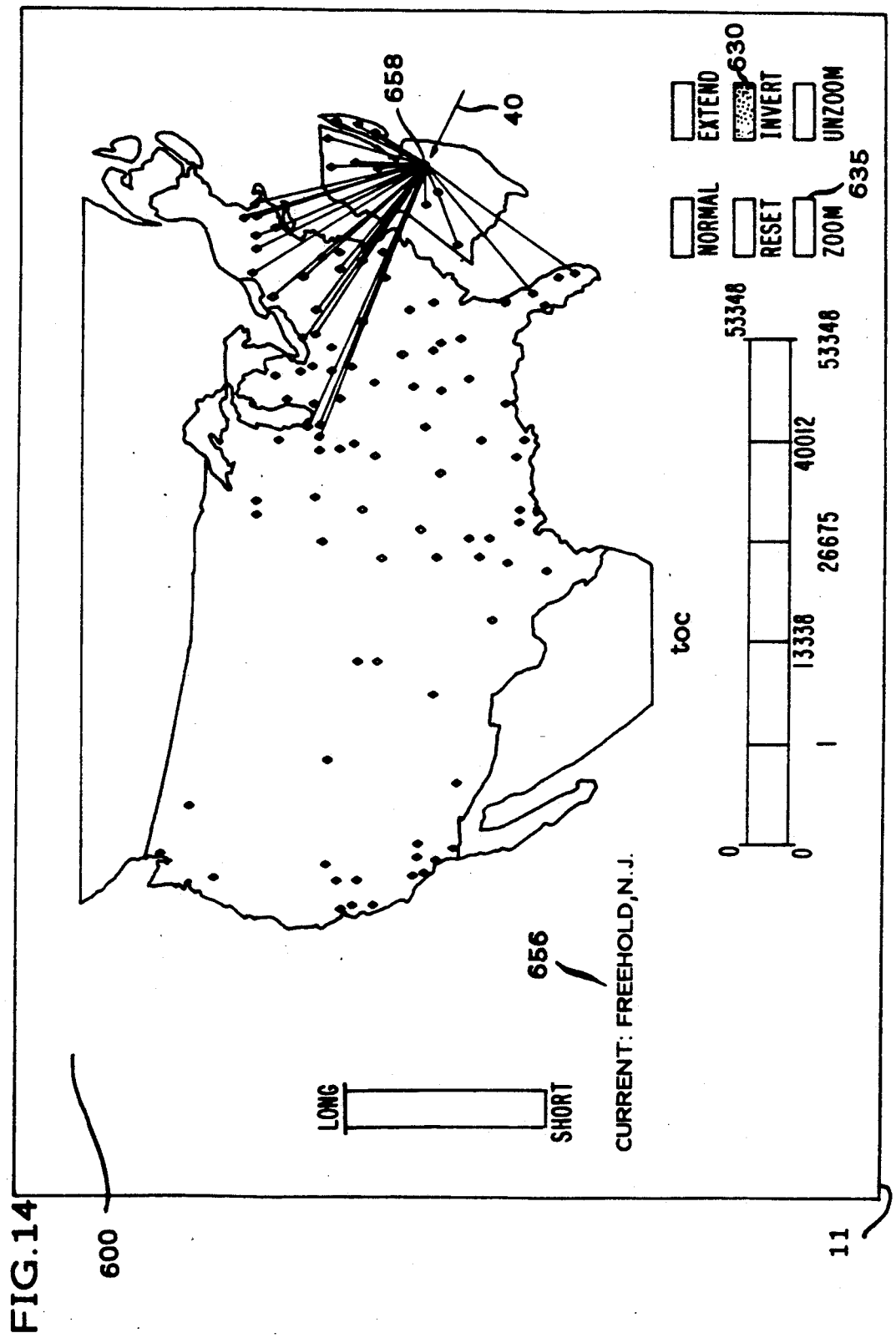

Alternatively, the user may employ the "brush" to activate a node. For example, the user may invert map 600 after it is first brought up on the screen. When the user does so, computer 10 places all of the displayed nodes in an inactive (deactivated) status, as shown in FIG. 13. The user may then reactivate a node by "brushing". The user reactivates a node by pointing to the node while operating mouse button 14a. An illustrative example of reactivating one or more nodes is shown in FIG. 14 in connection with node 658.

Figure 15:
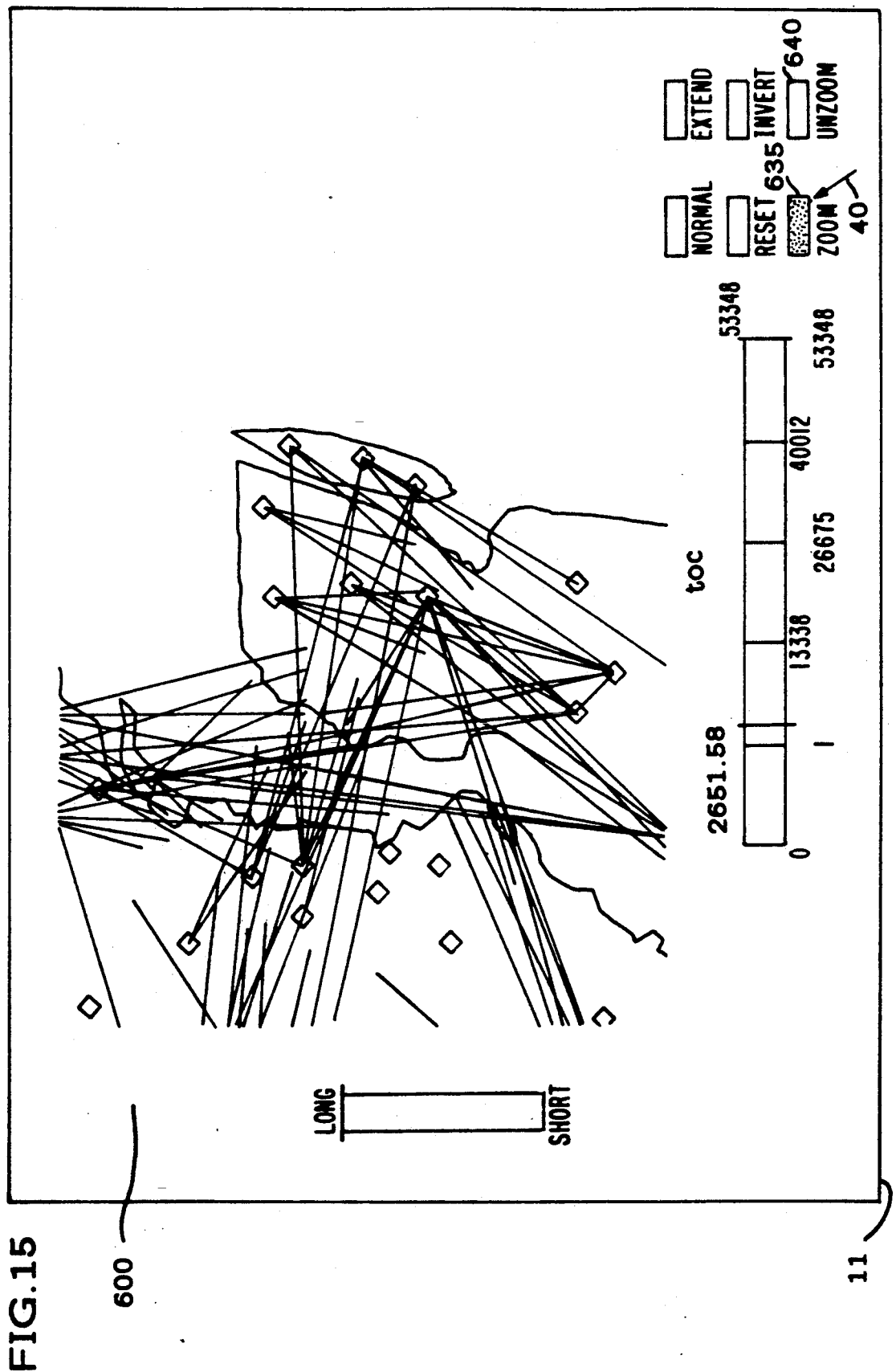

As mentioned above, the user may magnify a particular area of a displayed map using "Zoom" tool 635 in the manner discussed above. An illustrative example of magnifying a particular area of map 600 is shown in FIG. 15. Thereafter, the user may restore map 600 to its original state by pointing to "Unzoom" tool 645 and operating mouse button 14a.

Figure 16:
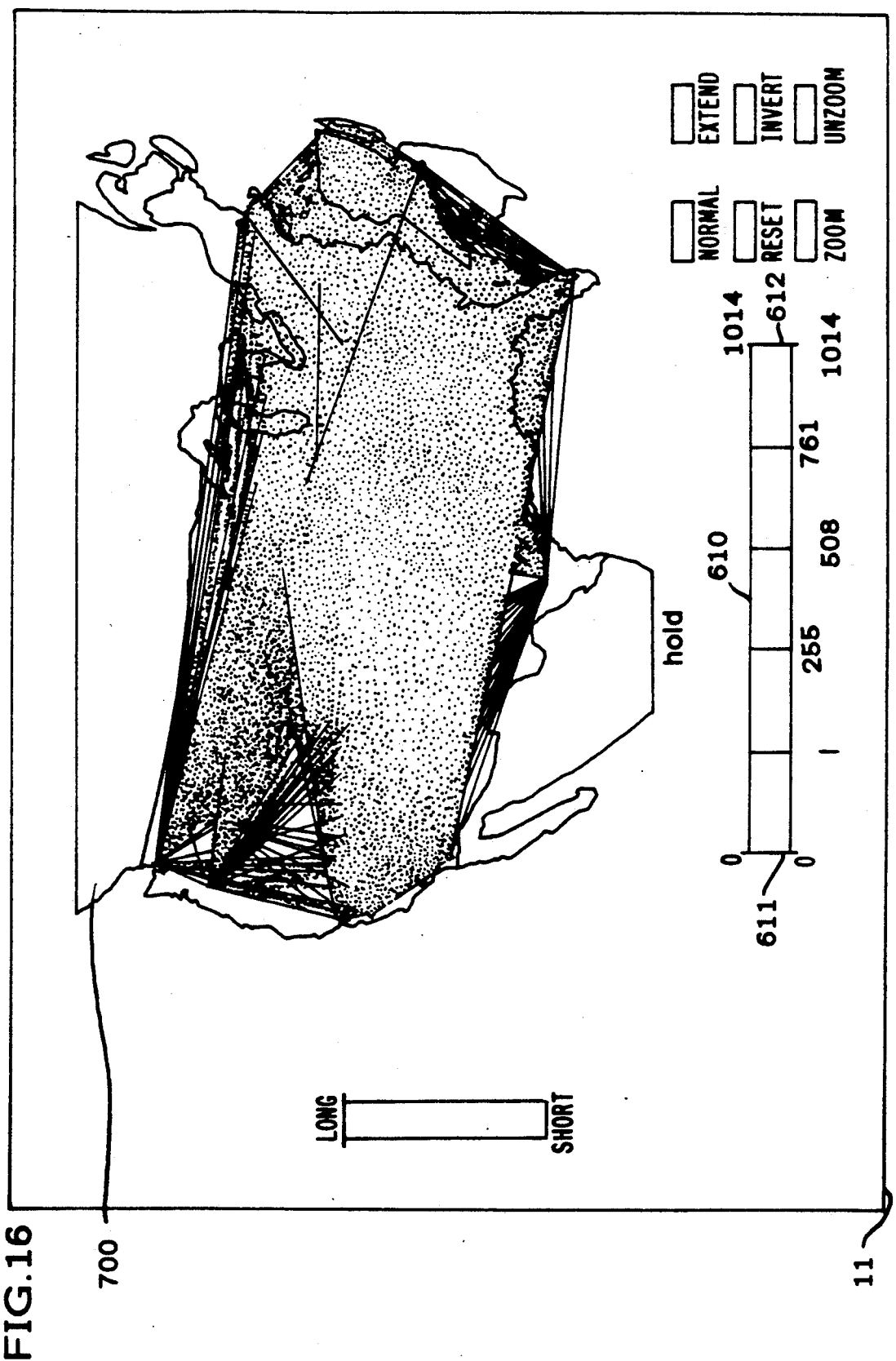
FIGS. 16 through 18 show various stages of second type of directed data as mapped on the screen of the computer of FIG. 1 in accordance with the principles of the invention.

To further illustrate the power of allowing the user to control the parameters under which particular data is displayed as a map, it is assumed that the user selects the data statistic dealing with call holding times. It is also assumed that the user has selected the same date and time (hour). When the user enters the appropriate command in the manner discussed above, then computer 10 displays the appropriate map on screen 11, as shown in FIG. 16. Similarly, each of the links illustrated in map 700 is indicative of the average holding time (seconds) of telephone calls exchanged between a respective pair of nodes. Further, each link is formed from two-half line segments to illustrate the direction of the associated statistic. It can be appreciated from a visual inspection of the FIG. that the density of the links is quite high. This is due to the fact that the AT&T network is large and, therefore, is constantly processing telephone calls.

Figure 17:
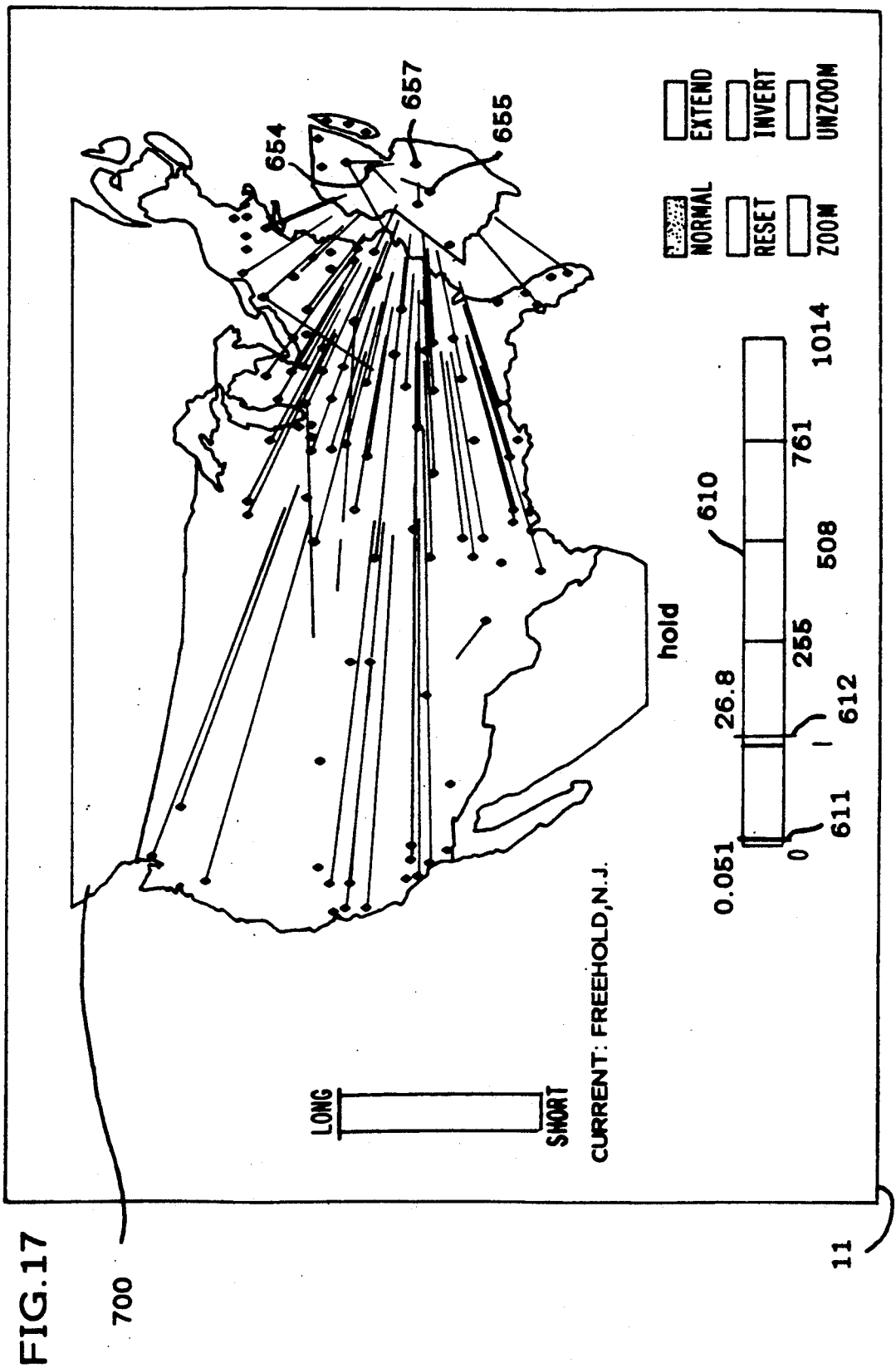

Notwithstanding the clutter, the user might still be interested in uncovering any underlying pattern(s) in the call holding times. One such pattern, or factor, could involve so-called short holding times, which might possibly be indicative of a network problem. Accordingly, all that the user needs to do to uncover links indicative of short holding times is to set a desired range of thresholds using threshold tool 610, which is now calibrated in seconds and which is now labeled as "hold" for—holding time. When the user does so, computer 10 erases from screen 11 those links whose respective data values fall outside of the selected range of thresholds, as shown in FIG. 17.

Figure 18:
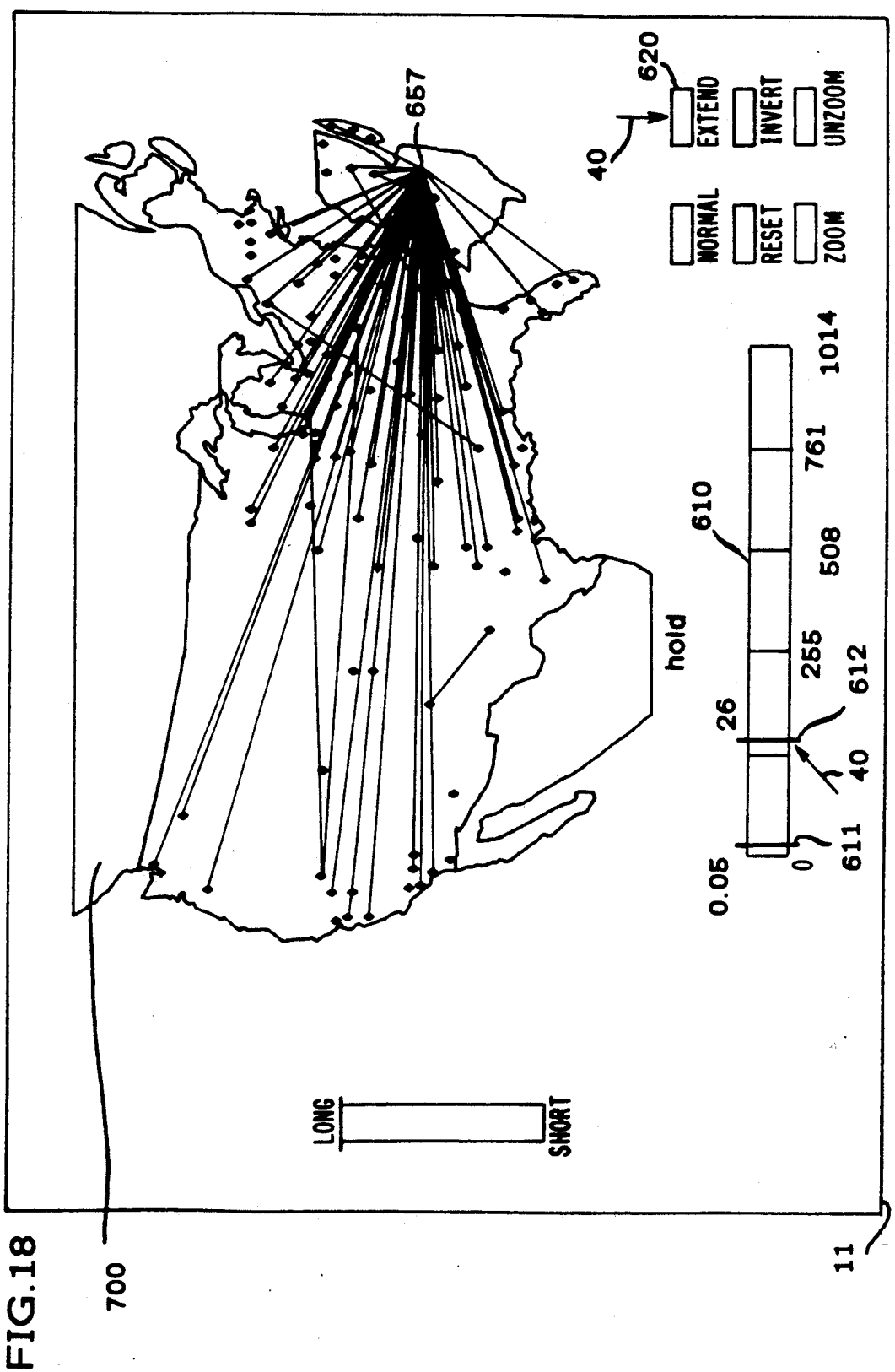

It is seen from the FIG., that the user has moved slider bar 611 to the right to establish a lower threshold of approximately 0.051 seconds and has moved slider bar 612 to the left to establish an upper threshold of approximately 26 seconds. As a result thereof, only the links and half-line segments whose statistics fall within the established range are displayed on screen 11. It can appreciated from a visual inspection of the FIG. that the pattern of the displayed segments appears to be pointing to node 657. To confirm that node 657 is experiencing short holding times, then, all that the user needs to do is to operate "Extend" tool 620 in the manner discussed above. When the user does so, computer 10 extends the half-line segments to the appropriate node, even though the data values associated with the extended segments fall outside of the range of thresholds established by the user, as shown in FIG. 18. It is seen from FIG. 18 that computer 10 has extended the half-line segments to node 657. As such, the user may possibly suspect that as a result of a problem associated with nodes 654 and 655, the network is experiencing a large number of short holding times into node 657.

As mentioned above, our invention may be used with virtually any type of statistic that involves links in a network. For example, our invention is appropriate for analyzing airline data, such as, for example, data associated with the number of passengers or average delays of airline flights.

Figure 19:
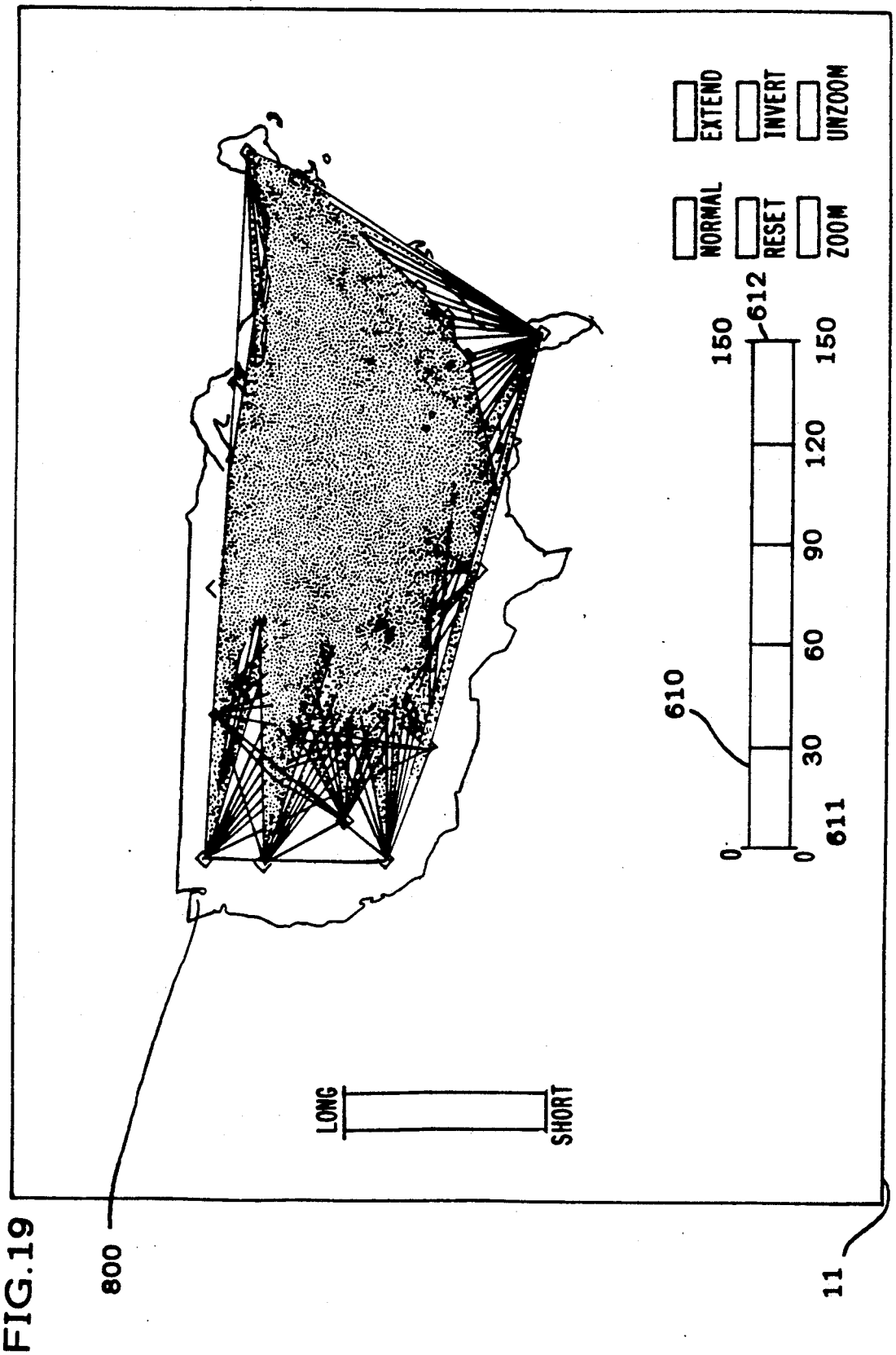
FIGS. 19 through 20 show two stages of a third type of directed data as mapped on the screen of the computer of FIG. 1 in accordance with the principles of the invention.

Turning then to FIG. 19, there is shown a map 800 depicting hypothetical airline data associated with delay times of respective airline flights scheduled between respective airports depicted by somewhat diamond shaped symbols. As before, the values of the delays are represented by links between the airports, in which the links are formed from directed half-line segments. However, because of the high density of the link segments, it is virtually impossible to determine from map 800 the possible cause and its location for the largest delays in the flight times.

Figure 20:
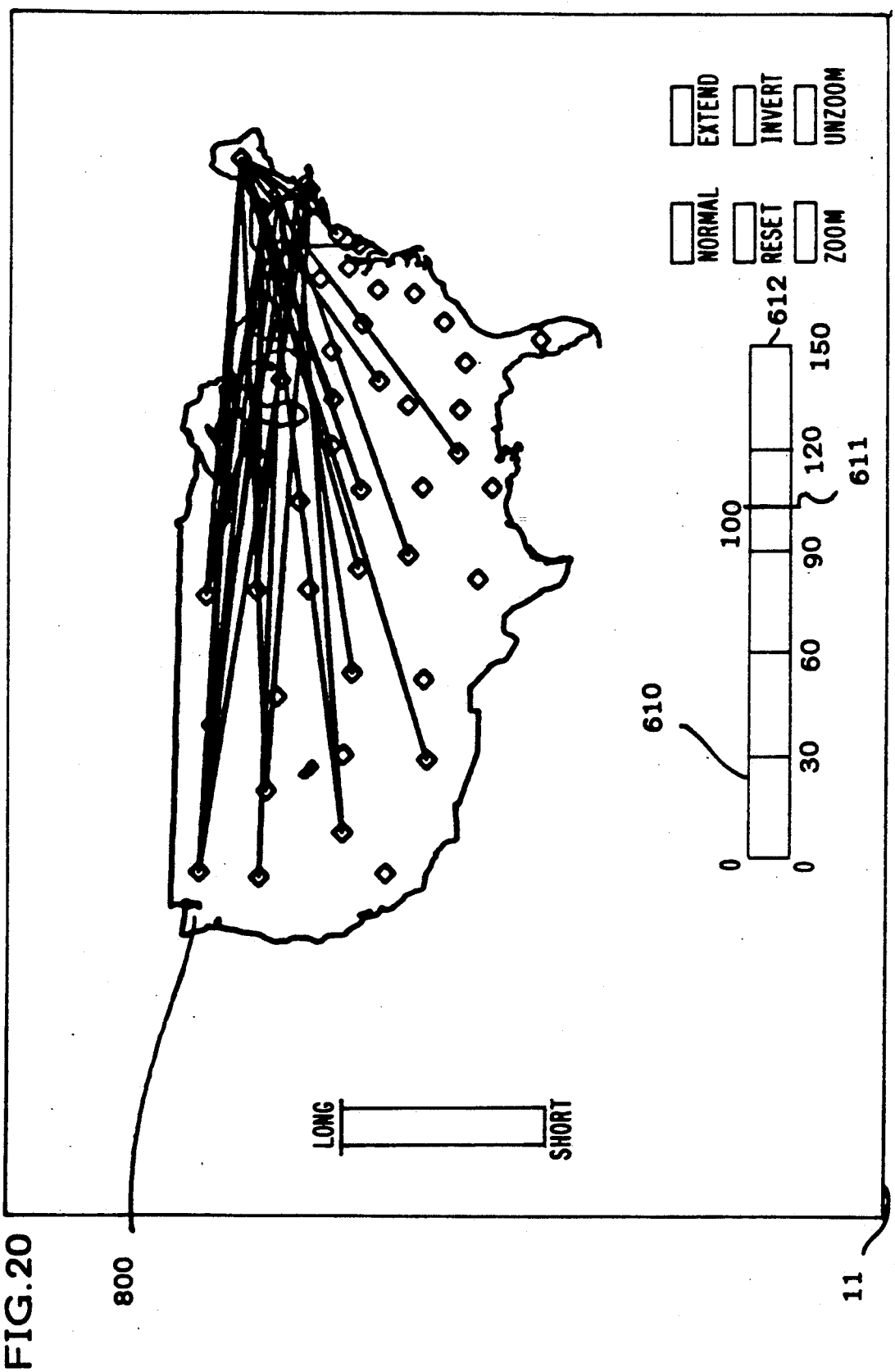

As before, the user may eliminate the clutter displayed in map 800 by controlling, in accord with the invention, one or more of the parameters used in displaying the data to locate the source of the problem. The user may do this using one or more of the aforementioned tools, such as threshold tool 610 to set a threshold for delay times. Accordingly, assuming that the user operating slider 611 in manner discussed above sets a lower boundary threshold of, for example, a delay time exceeding 100 minutes, then computer 10 will display on screen 11 only those links whose respective data values exceeds 100 minutes, as shown in FIG. 20. It is seen from the FIG. that the links that are now displayed on screen 11 are directed toward the Northeast, the possible location for delay times exceeding 100 minutes. Further investigation on the part of the user may reveal that the possibly bad weather conditions in the Northeast are the cause for the large delay times.

We turn now to a discussion of the software program which implements the invention in computer 10.

Figure 21:
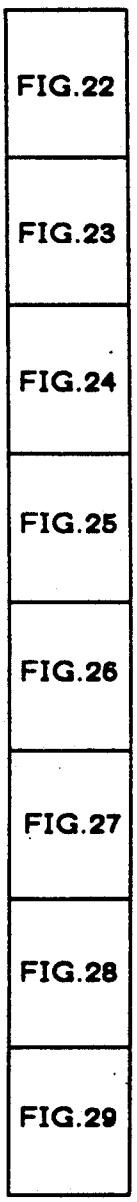
FIG. 21 shows the manner in which FIGS. 22 through 29 should be arranged.
Figure 22:
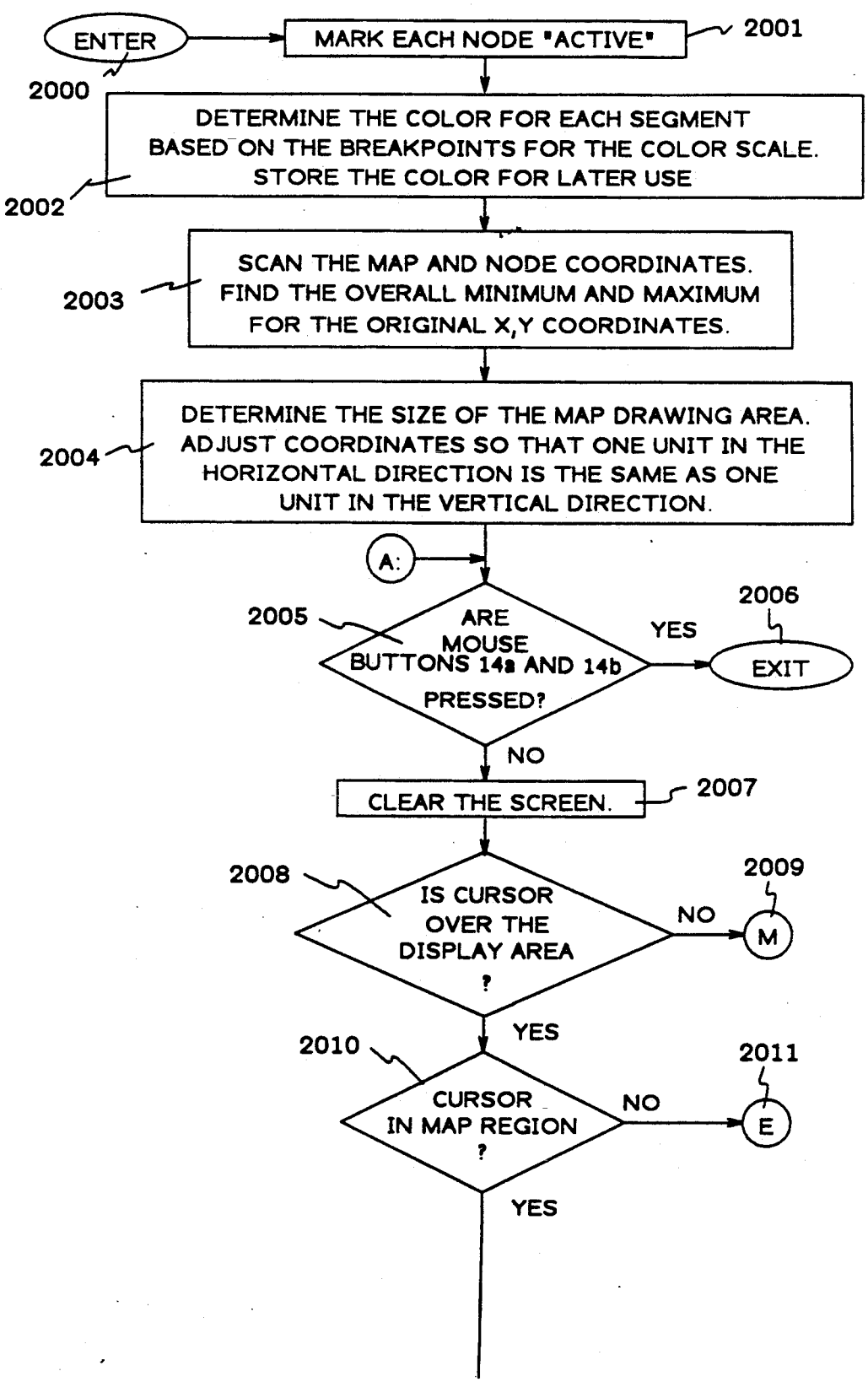
FIGS. 22 through 29 are flow charts of the program which implements the invention in the computer of FIG. 1.
Figure 23:
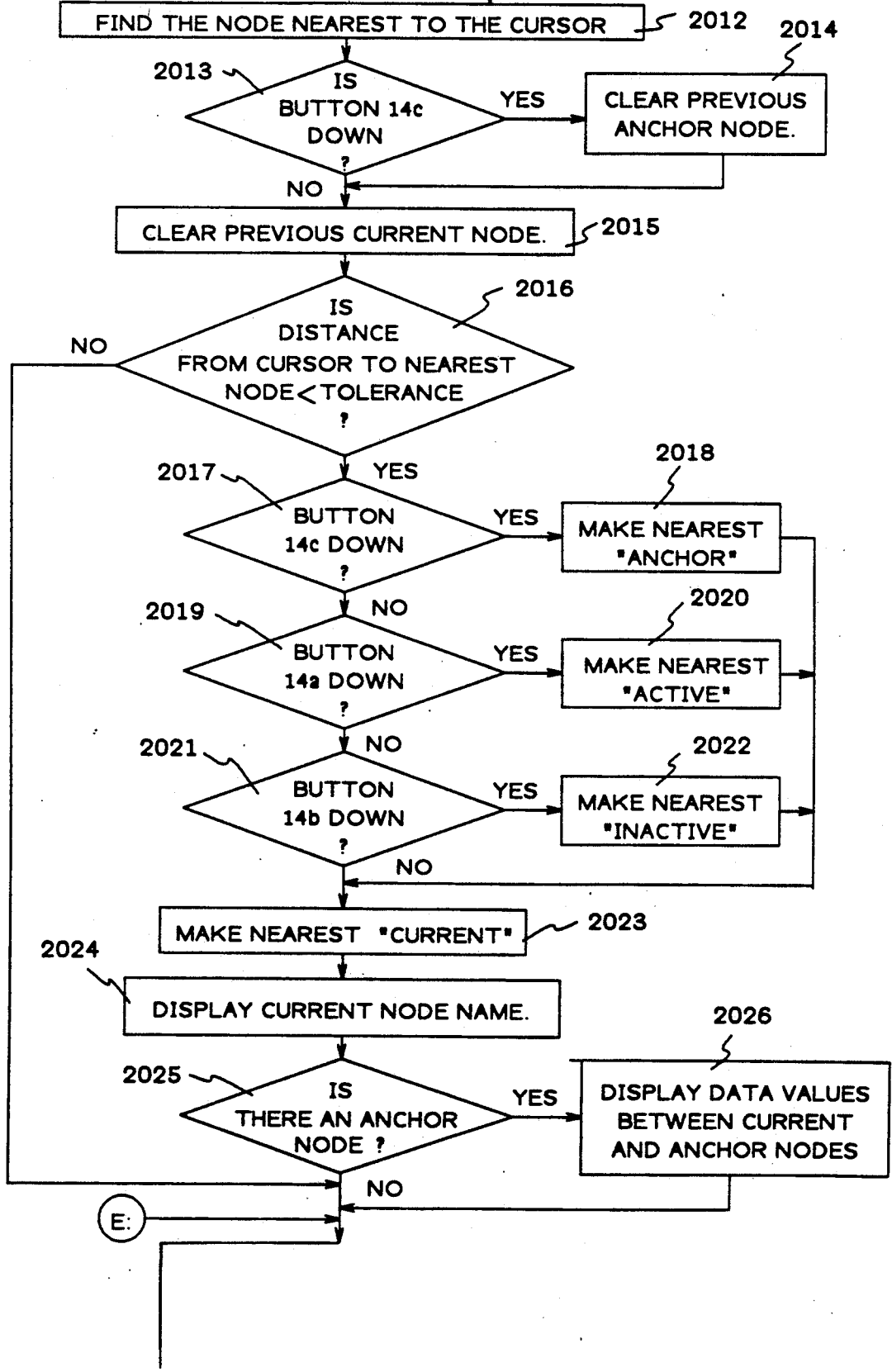
Figure 24:
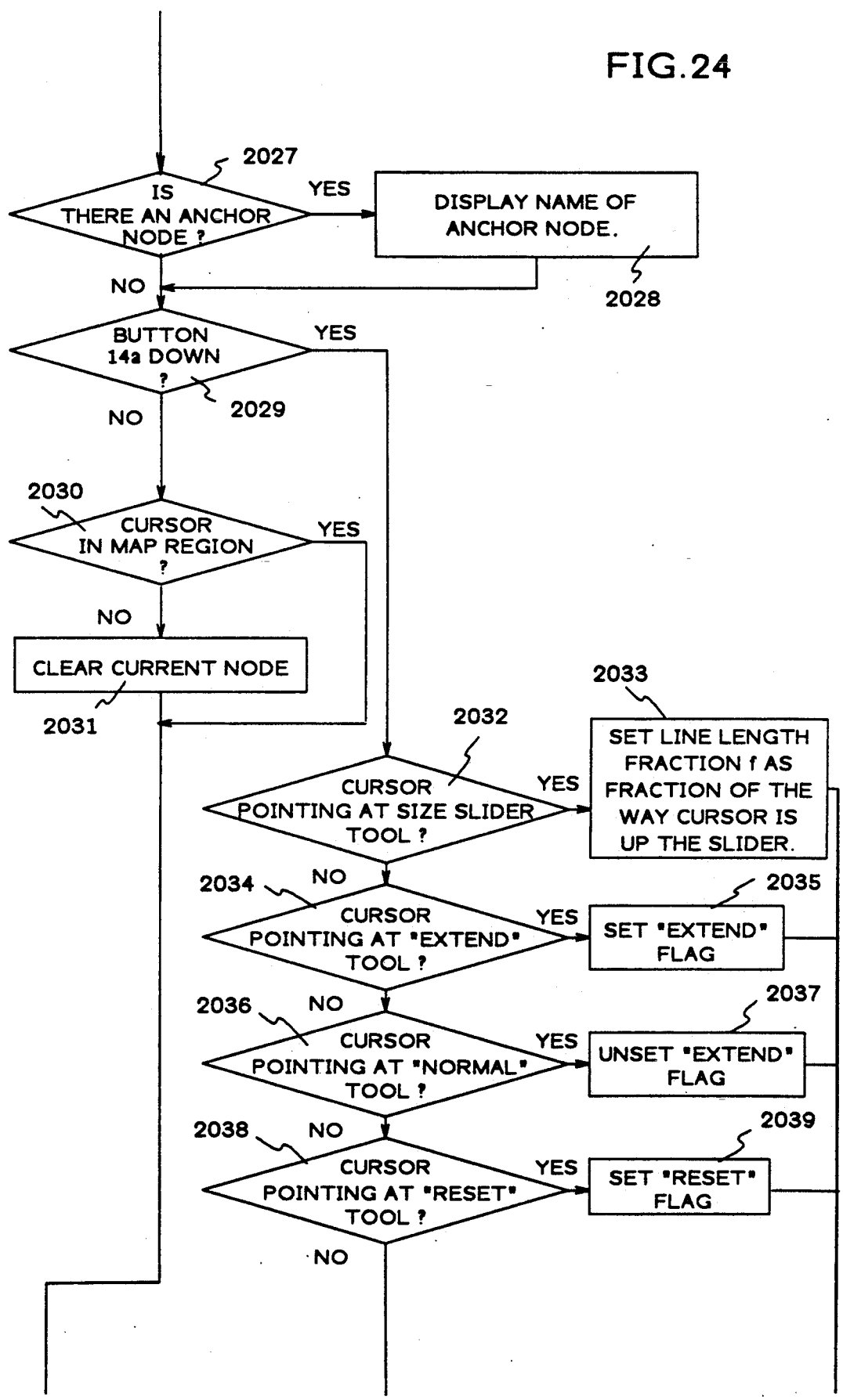
Figure 25:
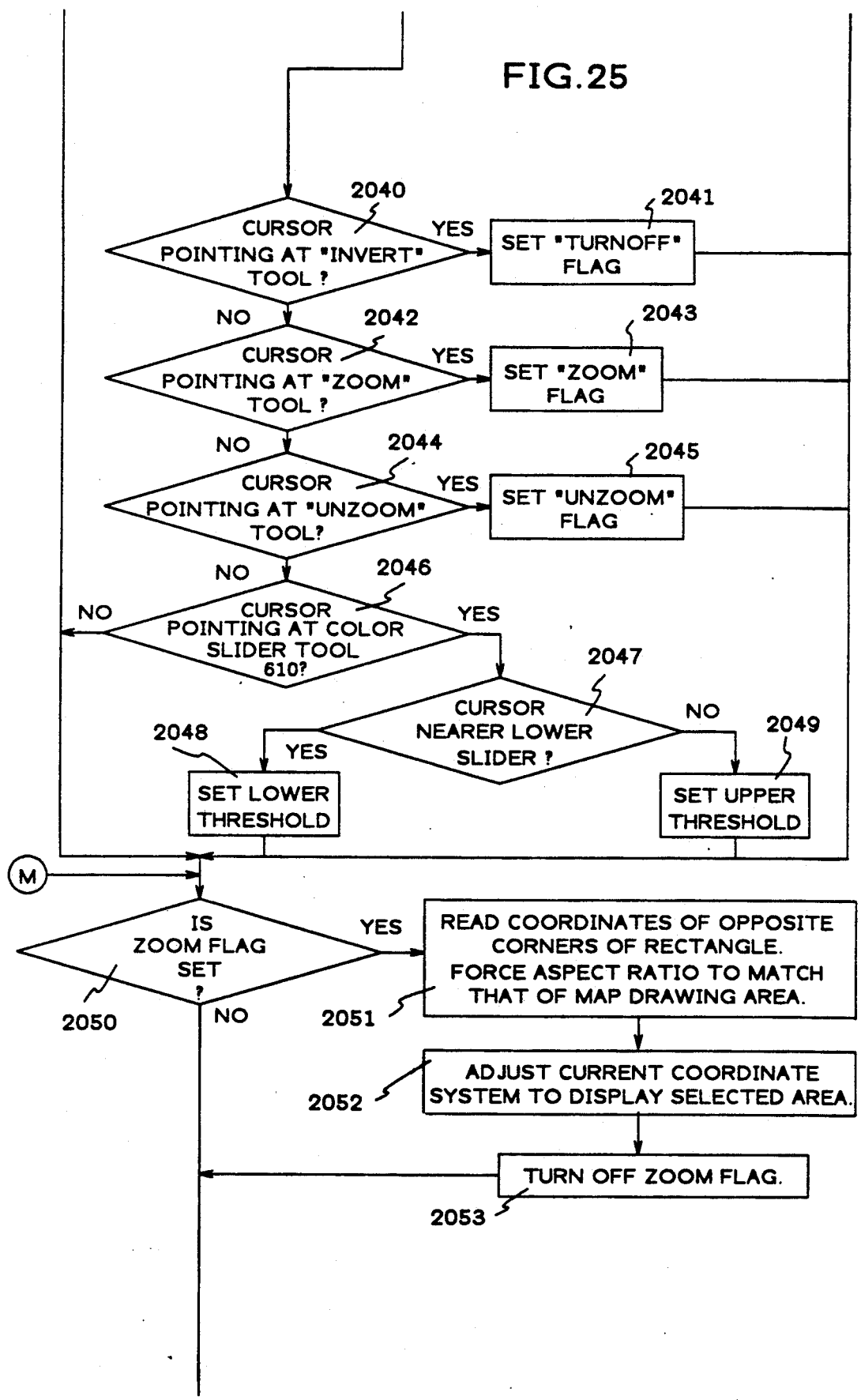
Figure 26:
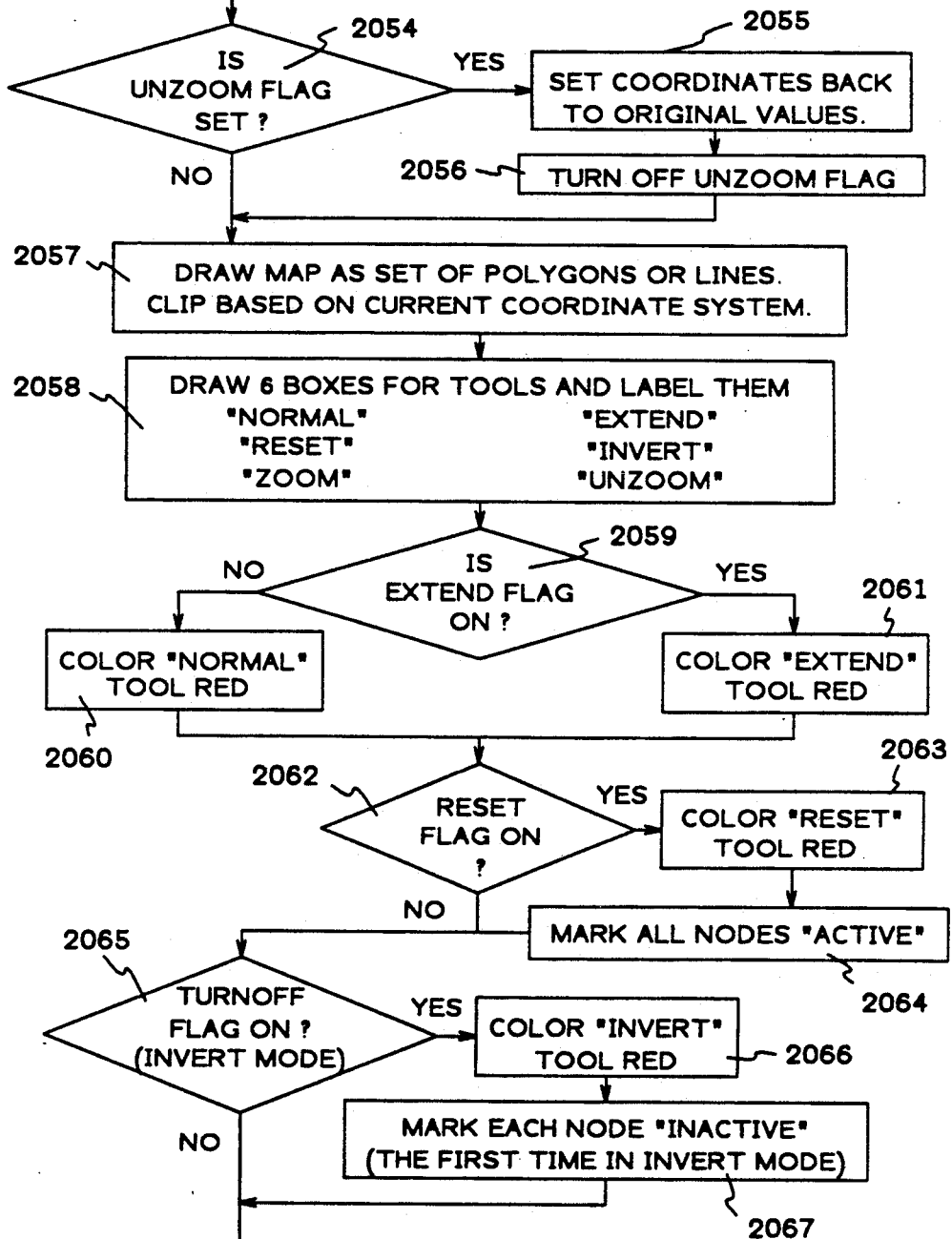
Figure 27:
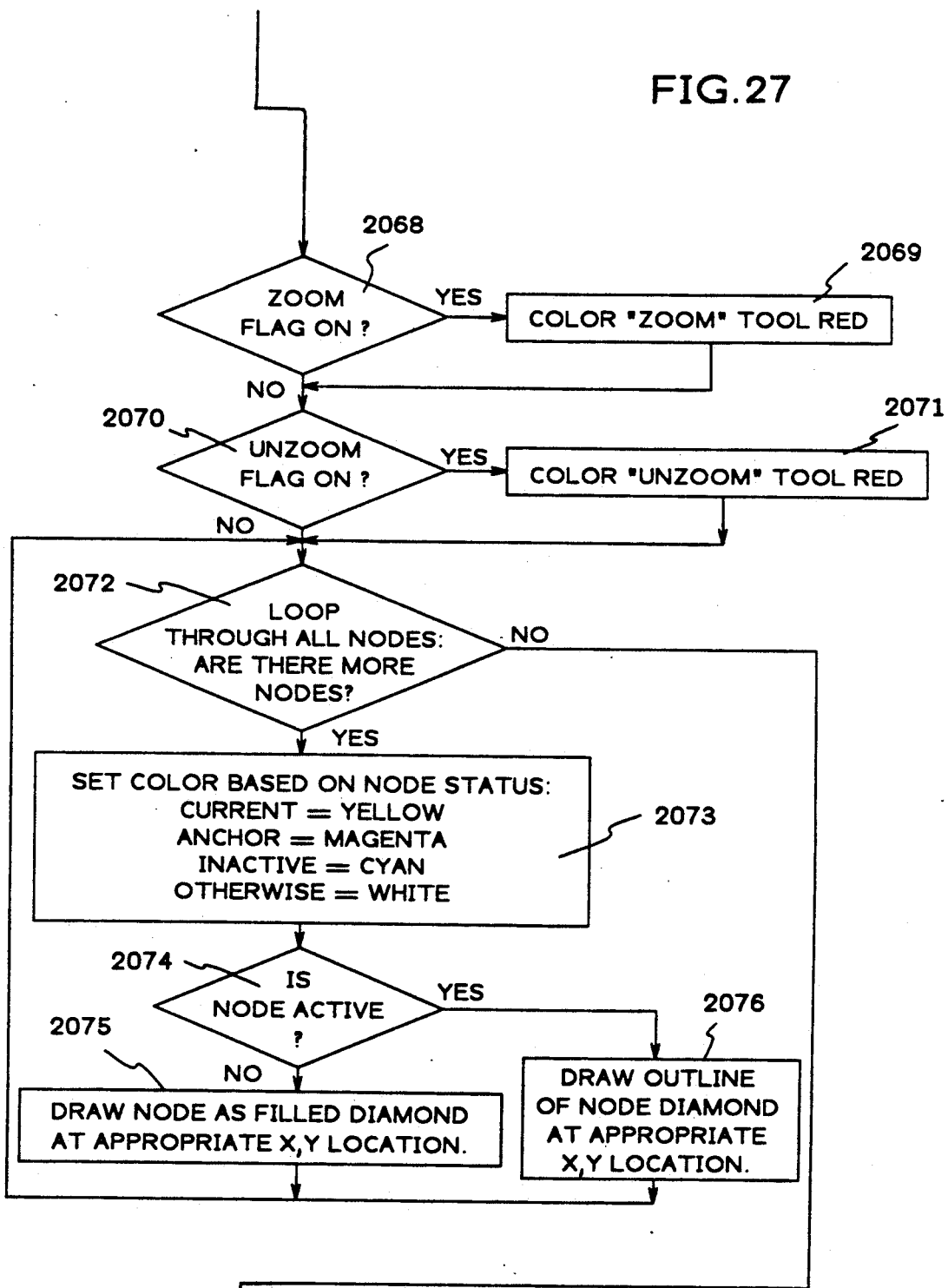
Figure 28:
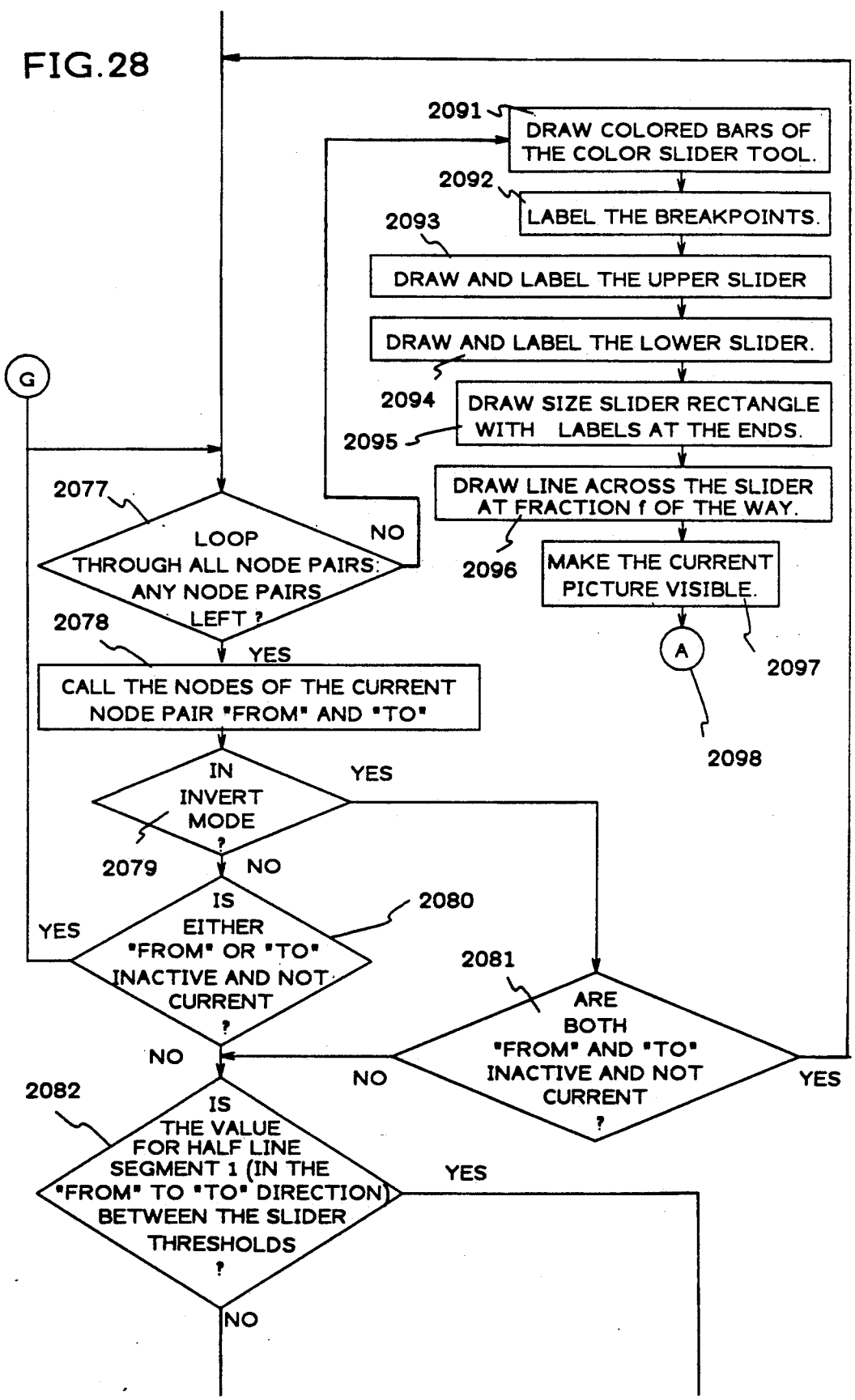
Figure 29:
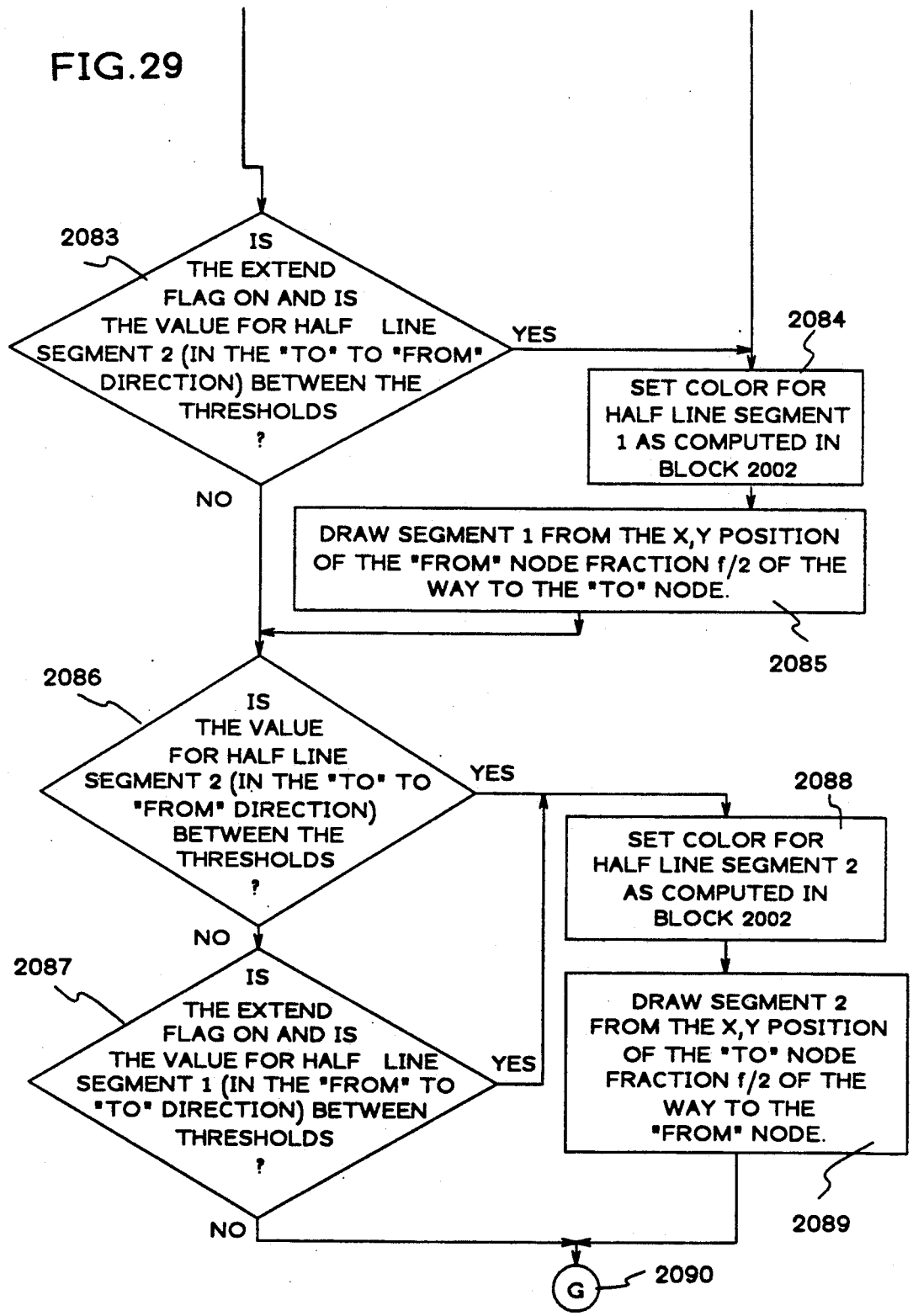

Turning then to FIGS. 22 through 29, which should be arranged as shown in FIG. 21, the program is entered at block 2000 where it proceeds to block 2001. At block 2001, the program uses a plurality of storage elements, one for each node, to record the status of each node, and mark each one of the nodes "active". The program then proceeds to block 2002 where it uses the value of the statistic to calculate and record in another plurality of storage elements the color that each half-line segment will be drawn on screen 11. It is noted that the displayed color of each segment is determined by the values of breakpoints (shown in FIG. 2), and the value of the statistic. Further, the display may be achieved with various maps and locations of the nodes, in which a map is drawn by a series of straight line segments displayed on screen 11, and in which each segment is determined by the x (horizontal) and y (vertical) coordinates of its end points.

At block 2003, the program determines the overall minimum and maximum values of the aforementioned coordinates to set the boundary for map 600. The program then proceeds to block 2004 where it ensures that the map, when drawn on the screen, has the appropriate aspect ratio. (The map coordinates are assumed to be commensurate with each other, meaning that one unit in the x direction should occupy the same length on the display as one unit in the y direction.)

At block 2005, the program begins the main loop of the program. Specifically, if the program finds that buttons 14a and 14b are both operated, then the program exits at block 2006. Otherwise, the program proceeds to block 2007, where it clears the display screen. In an illustrative embodiment of the invention, the display is "double buffered", meaning that two copies of the screen image are maintained. A so-called "front" copy is displayed on the screen while a second, or "back", copy is "manipulated" in memory. When the back copy has been completely drawn, the computer interchanges the front and back copies, making the former back copy visible (block 2097) and making it appear to the user as an instantaneous change in the display.

At block 2008, the program determines whether cursor 40 is pointing at a region of screen 11 that is displaying the map or tools and proceeds to block 2010 if it finds that to be the case. Otherwise, it proceeds to block 2050 via block 2009 to avoid performing the more specific tests of determining the position of cursor 40.

At block 2010, the program determines whether cursor 40 is in the rectangular region that is displaying the map and proceeds to block 2012 if it finds that to be the case. Otherwise, the program proceeds to block 2027 via block 2011, thereby avoiding all tests concerned with determining the proximity of the cursor to nodes on the map.

At block 2012, the program compares the distance from cursor 40 to all nodes on the map to determine which of the nodes is nearest to cursor 40. The program then proceeds to block 2013.

Blocks 2013 and 2014 represent a routine in which the program eliminates any previous anchor node if button 14c is found to be operated. At block 2015, the program eliminates the previous current node.

If the program finds that the distance from cursor 40 to the nearest node is greater than some predetermined tolerance (for example, 0.5 inches), then the program proceeds from 2016 to block 2027. Otherwise, the program executes blocks 2017 through 2022, in which the state of each of the buttons 14a, 14b, and 14c is interrogated to determine if the nearest node should be marked as the anchor or current node, or is to be made active or inactive.

At blocks 2023 and 2024, the program marks the nearest node as being the current node and displays the identity of that node in the manner shown above. At block 2025, the program determines if there is an anchor node (which would have been set in some prior execution of step 2018). The program proceeds to block 2026 if it finds that to be the case to display the current values of the two directional statistics between the current and anchor nodes.

At block 2027, the program determines if there is an anchor node and, if so, displays the identity of that node, as shown above.

At block 2029, the program determines if button 14a is operated. If it is, the user may be trying to manipulate one of the tools. Accordingly, the program proceeds to execute blocks 2032 through 2049 to determine what function it should perform. Otherwise, the program proceeds to block 2030 where it checks to see if cursor 40 has been moved out of the displayed rectangular map region. If the program finds the latter to be the case, then it proceeds to block 2031 where it eliminates any previous current node.

At block 2032, the program tests to see if cursor 40 is pointing at tool 605, and if so, proceeds to block 2033 to set a variable flag to indicate the fraction of the way that the cursor is vertically positioned up slider 606 (from 0 if the cursor is at the bottom to 1 if the cursor is at the top).

Blocks 2034 through 2045 represent a routine which checks the position of cursor 40 to see if it is pointing at one of the tools 615, 620, 625, 630, 635, or 640. If the program finds that cursor 40 is pointing to one of those tools, then the program sets a respective flag indicative of that fact. The program thereafter tests the states of the flags to to control the drawing of map 600 on screen 11.

Blocks 2046 through 2049 represent a routine which deals with tool 610. That is, if the program finds that cursor 40 is pointing at slider tool 610, then, at block 2047, it determines if cursor 40 is closer to the lower threshold 611 or upper threshold 612 and adjusts the appropriate threshold at blocks 2048 and 2049. The program sets the threshold using linear interpolation between the breakpoints.

At block 2050, the program tests the state of the "zoom" flag that may have been set at block 2043. If the program finds that the flag was set, then the user must (a) position cursor 40 at some point on the map display, (b) depress button 14a, (c) move to another position on map 600, and (d) release button 14a. The program uses the two positions to determine the location of each of the two opposite corners of a rectangle that that will be magnified to fill the region of screen that is occupied by map 600. Once again, the program ensures that the distance occupied by one unit in the x direction is identical to that occupied by one unit in the y direction.

At block 2052, the program sets the lower and upper coordinate limits for the map region so that only the selected portion of the map is displayed. (It is noted that on many computer systems, the system graphics software or hardware will automatically clip (suppress) any graphics that are drawn outside of this specified set of limits). At block 2053, the program turns off the "zoom" flag.

At block 2054, the program determines if the "unzoom" flag is set. (The program sets the "unzoom" flag at block 2045). If the program finds the "unzoom" flag set, then, at blocks 2055 and 2056, the program resets the coordinate limits of the map to their original values as determined at block 2003 and then resets the "unzoom" flag.

At block 2057, the program draws the map by drawing a series of connected line segments or filled polygons, clipping any lines or polygons outside of the coordinate limits, and then proceeds to block 2058 where it draws and labels the boxes for the 6 tools 615–640.

At block 2059, the program tests the state of the "extend" flag (which may have been set at either block 2035 or 2037). The program at blocks 2060 or 2061 colors the appropriate tool 615 or 620 red based on the state of the "extend" flag. The program then proceeds to block 2062 where it checks to see if the "reset" flag is set (the "reset" flag may have been set at block 2039). If the program finds that the "reset" flag is set, then it proceeds to block 2063 where it colors tool 625 red. The program then proceeds to block 2064 to mark all nodes active, as was done at block 2001.

The program at block 2065 tests to see if the "turnoff" flag is set (as would be the case at block 2041). If the program finds that flag set, then it proceeds to block 2066 where it colors tool 630 red. The program then proceeds to block 2067 where it scans through all nodes and marks each node inactive. (The program performs this latter action only for the first time that the "turnoff" flag is set and will only perform the action once again if the "turnoff" flag is reset).

Blocks 2068 through 2071 represent a routine which tests the "zoom" and "unzoom" flags and which colors in boxes 635 and 640 if appropriate.

The program at block 2072 starts a loop through all displayed nodes. When all of the displayed nodes have been processed, the program proceeds to block 2077.

Specifically, at block 2073, the program sets the color based upon the status of the node being processed. At block 2074, the program tests the node status and if it is found to be active, then, at block 2076, the program draws the node as an appropriately colored diamond outline; otherwise the program draws the node as a filled diamond at block 2075.

The program at block 2077 begins a loop through all node pairs. As mentioned above, each node pair corresponds to two half-line segments drawn on screen 11. Blocks 2078 through 2089 of the loop determine whether the half-line segments should be actually drawn. Thereafter, the program proceeds to block 2091 when it has processed all node pairs.

As an expediency, the program at block 2078 names the two nodes of the node pair that the program is processing as the "from" node and the "to" node, respectively.

The program at blocks 2079 through 2081 suppresses the half-line segments associated with all inactive nodes. In particular, the program at block 2079 determines if the "turnoff" flag is set (invert mode), and if so, does not draw the half-line segments if it finds that both the "from" and "to" nodes are inactive and neither node is current (as tested at block 2081). (This action is shown by returning control of the program to block 2077.) If, on the other hand, the program finds that the "turnoff" flag is not set, then neither half-line segment is drawn if either of the "from" or "to" node is inactive and not current (as tested at block 2080). In the latter case, control of the program is returned to block 2077.

Blocks 2082 through 2089 represent a routine which draws the half-line segments that are brought up on screen 11. (In the following discussion the half-line segment representing the flow of data from the "from" node to the "to" node is identified as segment 1. The associated half-line segment, which represents the opposite flow of data is identified as segment 2.)

Specifically, at block 2082, the program tests the statistic associated with segment 1 to see if has a value that lies between the lower and upper thresholds established by tool 610. If so, the program proceeds to block 2084 to draw segment 1. If not, then segment 1 may still be drawn if the data value for segment 2 lies between the thresholds and the extend flag is on. This is action is determined at block 2083. At block 2084, the program sets the color for drawing segment 1 based on the determination made at block 2002. At block 2085, segment 1 is drawn from the "from" node a fraction f/2 of the way to the "to" node (where fraction "f" is set at block 2033). Since "f" may vary between 0 and 1, the line may be drawn at most to the midpoint between the "from" and "to" nodes.

The program at blocks 2086 through 2089 conditionally draws segment 2 as was similarly done for segment 1 at blocks 2082 through 2085. However, in doing so, the program interchanges the roles of segments 1 and 2. The program then proceeds to block 2090 after completing the foregoing task.

At block 2090, the program returns to block 2077 to process the next node pair. The program then proceeds to block 2091 when it has completed processing the node pairs.

The program at blocks 2091 through 2094 draws tool 610 on screen 11. In particular, at block 2091, the program draws the colored segments 651 through 655, and at block 2092 labels, underneath the tool, the positions that delimit the ends of the colored bars with the appropriate values of the displayed statistic. The program then proceeds to block 2093 where it draws upper slider 612 and labels it with the value of the upper threshold. The program then proceeds to block 2094 to draw lower slider 611 and label that slider with the value of the lower threshold, as shown in the above FIGS.

At block 2095, the program draws the outline of size slider tool 605 and labels the endpoints thereof in the manner shown above. At block 2096, the program draws the horizontal slider line 606 across tool 605 a fraction "f" of the way from bottom to top. The program then proceeds to block 2097 where it makes the current "picture" visible by interchanging the front and back buffers, as discussed above. The program then proceeds to block 2098 where it returns to block 2005, thereby completing one cycle of the main drawing loop.

The foregoing is merely illustrative of the principles of our invention. Those skilled in the art will be able to devise numerous arrangements, which, although not explicitly shown or described herein, embody those principles that are within its spirit and scope. For example, in the arrangement illustrated in FIG. 1, computer 10 could be readily arranged to perform the function of data management system 30. In this way, computer 10 would obtain the data directly from the nodes themselves. Alternatively, the user could load the data directly into computer 10, thereby eliminating the need for a data management system. Further, although the invention was discussed in the context of using a geographical map, it is clear that any type of layout, or pattern, of the nodes in a directed graph could be used in the practice of the invention. In addition, the data could be "signed" (e.g., + or −) to illustrate the changes in the data occurring from one period to another. Moreover, the threshold tool could be arranged so that the user could establish more than one, and possibly a large number of threshold ranges. Further, the latter tool may be arranged so that the user may input via the keyboard the minimum and maximum values of the threshold tool, and, alternatively, input the values of the thresholds themselves. In addition, our invention could be employed to analyze other types of data, such as, for example, non-directed data, which may or may not be time-varying. Further, the scale 612 of tool 610 could be divided into any number of segments, each having a different color. Also, the displayed links, or partial lines, could vary in thickness based on the data values associated with their respective nodes.

We claim:

1. A dynamic graphics arrangement for use in a computer having a display comprising
    means for displaying on said display a plurality of nodes, said nodes being grouped into respective pairs of nodes based on a predetermined criterion associating the nodes in each pair with one another, at least one of said pairs comprising first and second nodes,
    means for displaying on said display at least one vector having exterior end points respectively connected to said first and second nodes, said at least one vector being formed from at least two displayed segments indicative of said criterion, said segments being substantially in contact with one another at their interior end points, and
    means for allowing a user of said arrangement, using any one of a plurality of associated adjustable parameters displayed on said display, to dynamically adjust the lengths of said at least two segments in order to separate said segments from one another at their interior end points and to dynamically increase said separation.

2. A dynamic graphics arrangement for use in a computer having a display comprising
    means responsive to a request inputted by a user of said computer for displaying on said display a plurality of nodes grouped into at least respective pairs of nodes based on a common, predetermined relationship that the nodes in each of said pairs have with one another,
    means for displaying on said display a plurality of continuous lines respectively disposed between the nodes forming respective ones of said pairs of nodes, each of said lines being formed from at least two segments, each of said segments being indicative of a level quantifying the common, predetermined relationship that its associated node has with the other one of said nodes forming a respective one of said pairs of nodes, and
    means for displaying on said display a plurality of adjustable parameters each operative by said user for dynamically adjusting the lengths of individual ones of said line segments in order to separate such line segments from one another at their interior end points.

3. The arrangement set forth in claim 2 wherein one of said displayed parameters is a size tool operative by said user for dynamically controlling the lengths of said displayed segments beginning at their interior end points.

4. The arrangement set forth in claim 2 wherein said common, predetermined relationship is a predetermined class of data, and wherein each of said segments is indicative of the level of said predetermined class of data that its associated node is outputting to the other node in a respective one of said pairs of nodes, wherein one of said displayed parameters is a data threshold tool settable by said user for controlling the display of said segments, and wherein said arrangement further comprises means responsive to said user setting said data threshold tool to a respective range of data thresholds for effectively erasing from said display those line segments representing respective levels of data not within the range established by said user.

5. The arrangement set forth in claim 4 wherein another of said displayed parameters is a tool operative by said user when at least one of the segments forming one of said links has been effectively erased from said display for extending the interior end point of the remaining one of the segments to the node associated with the erased one of the segments.

6. The arrangement set forth in claim 4 wherein each of said nodes has a respective identity and wherein said means for displaying said links includes means operative when said user points to one of said nodes so as to mark that node as being an anchor node for displaying the identity of said anchor node as well as the levels of data associated with said anchor node.

7. The arrangement set forth in claim 6 wherein said means for displaying said links further includes means operative when said user points to another one of said nodes so as to mark that node as being a current node for displaying with the identity of said anchor node the identity of said current node as well as the levels of data indicative of said common, predetermined relationship between said anchor and current nodes.

8. The arrangement set forth in claim 2 further comprising means for displaying on said display a tool operative by said user for controlling the magnification of a particular area of said display.

9. The arrangement set forth in claim 2 further comprising means for displaying on said display a plurality of tools including a tool operative by said user for deactivating one of said displayed nodes when said user points to that node, for displaying on said display a symbol representing said deactivated one of said nodes and for erasing from said display the links associated with that node.

10. The arrangement set forth in claim 8 wherein each of said nodes has a respective identity and wherein said plurality of tools further includes a tool operative by said user for reactivating said deactivated node and for displaying on said display the identity of that node.

11. The arrangement set forth claim 2 further comprising means for displaying on said display a plurality of tools including a tool operative by said user for deactivating all of said displayed nodes.

12. The arrangement set forth in claim 10 further comprising means responsive to user deactivating said displayed nodes for displaying on said display a plurality of symbols representing respective ones of said deactivated nodes and for effectively erasing from said display said links.

13. The arrangement set forth in claim 11 wherein each of said nodes has a respective identity and wherein said plurality of tools further includes a tool operative by said user for reactivating at least one of said nodes when said user points to its respective displayed symbol and for displaying on said display the identity of said reactivated node and its associated links.

14. A dynamic graphics arrangement for use in a computer having a display comprising means responsive to a request inputted by a user of said computer for displaying on said display a plurality of nodes representing respective sources of data, said sources of data having a spaced-apart relationship with one another, said nodes being grouped into respective pairs of nodes based on a predetermined data criterion associating the nodes in each pair of said nodes with one another and for displaying a plurality of continuous lines respectively disposed between the nodes forming respective ones of said pairs of nodes; each of said lines being formed from half lines quantifying said data criterion associated with their respective nodes, and means for displaying on said display a threshold tool operative by said user for controlling the display of individual ones of said lines such that said user may effectively erase from said those of said half lines representing respective data values which are not within a threshold established by said user operating said threshold tool.

15. The arrangement set forth in claim 14 wherein each of said links is formed from two associated segments having interior end points meeting one another and having an exterior end point extending to a respective one of the nodes forming a respective pair of nodes.

16. The arrangement set forth in claim 15 wherein said means for displaying said tool includes means for displaying another tool operative by said user for changing the length of each of said displayed segments such that each of said two associated segments are separated from one another in accordance with a ratio established by said user operating said other tool.

17. The arrangement set forth in claim 15 wherein said arrangement further comprises means for displaying another tool operative by said user when at least one of the segments forming a respective one of said links has been effectively erased from said display for extending the interior end point of the remaining segment to the node associated with the erased segment.

18. The arrangement set forth in claim 14 wherein said means for displaying said tool includes means for displaying another tool operative by said user for controlling the magnification of a desired area of said display.

19. The arrangement set forth in claim 14 wherein said means for displaying said tool includes means for displaying another tool operative by said user for deactivating one of said displayed nodes when said user points to that node, for displaying on said display a predetermined symbol in place of said one of said nodes and for erasing from said display the links associated with that node.

20. The arrangement set forth in claim 19, wherein each of said nodes has a respective identity and wherein said means for displaying said tool further includes means for displaying still another tool operative by said user for reactivating said deactivated one of said nodes when said user points to its deactivated symbol and for displaying the identity of the reactivated one of said nodes as well as said quantified data criterion associated with that node.

21. The arrangement set forth in claim 14 wherein said means for displaying said tool includes means for displaying another tool operative by said user for deactivating all of said displayed nodes.

22. The arrangement set forth in claim 21 further comprising means responsive to said user deactivating said displayed nodes for displaying on said display a plurality of other symbols representing respective ones of said deactivated nodes.

23. The arrangement set forth in claim 22 wherein each of said nodes has a respective identity and wherein said arrangement further comprises means for displaying still another tool operative by said user for reactivating at least one of said deactivated nodes when said user points to its respective displayed deactivated symbol, for displaying on said display the identity of the respective source of data represented by the reactivated node and for displaying the respective one of said links associated with the reactivated node.

24. The arrangement set forth in claim 14 wherein each of said nodes has a respective identity and wherein said means for displaying said links includes means operative when said user points to one of said nodes and marks that node as being an anchor node for at least displaying on said display the identity of said anchor node and said quantified data criterion associated with that node.

25. The arrangement set forth in claim 24 wherein said means for displaying said links further includes means operative when said user points to another one of said nodes so as to mark that node as being a current node for displaying with the identity of said anchor node the identity of said current node as well as said quantified data criterion associated with said anchor and current nodes.

26. A method of mapping on a display associated with a computer data associated with a plurality of nodes, said method comprising the steps of
responding to a request inputted by a user of said computer by displaying on said display a plurality of nodes grouped into at least respective pairs of nodes based on a common, predetermined relationship between the nodes in each of said pairs,
displaying on said display a plurality of lines disposed between the nodes forming respective ones of said pairs, each of said lines being formed from at least two segments having interior end points substantially in contact with one another, said segments being indicative of a level of data quantifying the common, predetermined relationship that its associated one of said nodes has with the other one of said nodes forming a respective one of said pairs of nodes, and
displaying on said display a number of adjustable parameters each operative by a user of said computer to dynamically separate the interior end points of individual ones of said segments by a distance determined as a function of said user adjusting a selected one of said displayed parameters.

27. The method set forth in claim 26 wherein said step of displaying said parameters includes the step of displaying as one of said displayed parameters a data threshold tool settable by said user for controlling the display of said segments, and wherein said method includes the step of
responding to said user setting said data threshold tool to a respective range of data thresholds by effectively erasing from said display those of said displayed segments representing data levels not within said range.

28. The method set forth in claim 26 wherein one of said displayed parameters is a size tool settable by said user for controlling the display of said segments, and wherein said method includes the step of
responding to said user setting said size tool to a respective value by adjusting the length of each of said segments as a function of said value.

29. The method set forth in claim 26 wherein each of said nodes has a respective identity and wherein said step of displaying said links includes the step of responding when said user points to one of said nodes and marks that node as being an anchor node by at least displaying on said display the identity of said anchor node and said level of quantified data associated with that node.

30. The method set forth in claim 29 wherein said step of displaying said links further includes the step of responding when said user points to another one of said nodes so as to mark that node as being a current node by displaying with the identity of said anchor node the identity of said current node as well as said level of quantified data indicative of said common, predetermined relationship between said anchor and current nodes.

31. A dynamic graphics arrangement for use in a computer having a display comprising
means for displaying on said display a plurality of nodes, said nodes being grouped into respective pairs of nodes based on a predetermined criterion associating the nodes in each pair with one another, at least one of said pairs comprising first and second nodes,
means for displaying on said display at least one vector disposed between said first and second nodes, said one vector being formed from at least two colinear segments, and
means for allowing a user of said arrangement, using any one of a plurality of associated adjustable parameters displayed on said display, to dynamically separate said at least two segments from one another beginning at their interior end points and to dynamically increase such separation.

32. A method of dynamically arranging graphics on a computer having a display comprising the steps of
displaying on said display a plurality of nodes, said nodes being grouped into respective pairs of nodes based on a predetermined criterion associating the nodes in each pair with one another, at least one of said pairs comprising first and second nodes,
displaying on said display at least one vector disposed between said first and second nodes, said one vector being formed from at least two colinear segments and
allowing a user of said arrangement, using any one of a plurality of associated adjustable parameters displayed on said display, to dynamically separate said at least two segments from one another beginning at their interior end points and to dynamically increase such separation.

* * * * *